United States Patent
Horowitz et al.

(10) Patent No.: US 7,636,684 B1
(45) Date of Patent: Dec. 22, 2009

(54) ISSUER MONITOR SYSTEM FOR MONITORING AND/OR ANALYZING FINANCIAL TRANSACTIONS AND METHOD OF USING THE SAME

(75) Inventors: Cheryl A. Horowitz, Fort Lee, NJ (US); Allen Williams, Montclair, NJ (US)

(73) Assignee: i-Deal LLC, New York, NY (US)

( * ) Notice: Subject to any disclaimer, the term of this patent is extended or adjusted under 35 U.S.C. 154(b) by 1623 days.

(21) Appl. No.: 10/102,953

(22) Filed: Mar. 22, 2002

Related U.S. Application Data

(60) Provisional application No. 60/283,335, filed on Apr. 13, 2001.

(51) Int. Cl.
*G06Q 40/00* (2006.01)
(52) U.S. Cl. ....................................................... 705/37
(58) Field of Classification Search .................... 705/37
See application file for complete search history.

(56) References Cited

U.S. PATENT DOCUMENTS

| | | | |
|---|---|---|---|
| 5,809,483 A | 9/1998 | Broka et al. | |
| 5,915,209 A | 6/1999 | Lawrence | |
| H002064 H * | 5/2003 | Buchalter | 705/37 |
| 6,560,580 B1 * | 5/2003 | Fraser et al. | 705/36 R |
| 6,629,082 B1 * | 9/2003 | Hambrecht et al. | 705/36 R |
| 6,876,309 B1 * | 4/2005 | Lawrence | 340/825.26 |
| 7,212,999 B2 * | 5/2007 | Friesen et al. | 705/37 |
| 7,415,436 B1 * | 8/2008 | Evelyn et al. | 705/37 |
| 2001/0054022 A1 * | 12/2001 | Louie et al. | 705/38 |
| 2002/0052816 A1 * | 5/2002 | Clenaghan et al. | 705/36 |
| 2002/0161690 A1 * | 10/2002 | McCarthy et al. | 705/37 |

\* cited by examiner

*Primary Examiner*—Jagdish N Patel
*Assistant Examiner*—Kenneth L Bartley
(74) *Attorney, Agent, or Firm*—Irah H. Donner; Wilmer Cutler Pickering Hale and Dorr LLP

(57) ABSTRACT

A system and method is disclosed for monitoring the flow of transactions during a security syndicate offering. The system comprises one or more security syndicate offerings offered for sale by an issuer, and a security syndicate transaction system. Various subsystems can be provided for storing and receiving information regarding the security syndicate offerings, and for processing information pertaining to transactions performed during the security syndicate offering. The system allows an issuer, remotely located from the security syndicate transaction system, to receive information associated with the security syndicate offerings from the security syndicate transaction system and transmit various information back to the security syndicate transaction system.

24 Claims, 25 Drawing Sheets

```
Xyplex - Reflection for UNIX and Digital
File  Edit  Connection  Setup  Macro  Window  Help
```

```
                General Information for Deal: CHERYLTEST

Size of Deal:     1,000,000       Issuer: TESTISSU     Corp: _____
    Issuer & Desc: CHERYLTEST                 : _____
                                              : _____
                                              : _____
                                              : _____
                                              : _____
                                              : _____
    On Behalf of: _____
Multiple Series? NO_   # Series: 1    Assigned to: _  Taxable? NO_ AMT? NO_ State: NY  Del? __
Series Code : ____   Size: _
Name: _____
Desc: _____

Comp/Nego/Priv/JtAc/LPO: NEGOTIATED     Rev/G.O.: REVENUE       Role: SM
BIDTESTR Office: BIDTESTR    Manager: BIDTESTR   Book Manager: BIDTESTR
Book Entry: YES   Clearing House: DTC         Status: PENDING   Reg'd: __
Bnk Qulfd? NO_ # Iss: _   Run by: ____   UW: _____
Use <RETURN> and the arrow keys to move, <LINE FEED> to save data and/or quit.
Ctrl-Z to enter competitive information. Ctrl-E for EOE information.
```

FIG. 4

```
Xyplex - Reflection for UNIX and Digital
File  Edit  Connection  Setup  Macro  Window  Help
```

```
               Series Information for Deal: CHERYLTEST

New, Refd
Adv Refd, Remkt: NEW    $_____       State: NY  Purpose: AIR___
                        $_____        Tax? NO    AMT? NO   /
     Award Date: 07/12/2001                       Moody: Aaa   /
1st Coupon Date: 01/07/2002 Freq? SEMI
Init Trade Date: _____ Firm? ___               S&P: AAA   /
  Delivery Date: 08/10/2001 Fwrd? NO
Settlement Date: 08/10/2001                       Fitch: ___   /
    Dated Date: 07/11/2001
Dated for zeros: _____                         D&P: ___   /
 Int. Accrues: _____
# Days Interest:         29
       LOC Bank: _____              Insured by: _____
   LOC Exp. Date: _____

Use <RETURN> and the arrow keys to move, <LINE FEED> to save data and/or quit.
```

FIG. 5

```
Xyplex - Reflection for UNIX and Digital
File  Edit  Connection  Setup  Macro  Window  Help Jul 26 2001              CHERYLTEST                        12:22:49 PM
                      $1,000,000
                              CHERYLTEST Bracket 1
                                                            Can Use
                          Participation                      EOE
Name
Test Customer for          250 (M)                            Yes
PC5
Co-Manager, Test           250 (M)                            Yes
Code
Bear, Stearns & Co.        250 (M)                            Yes
Inc.
Lehman Brothers            250 (M)                            Yes 4 Managers          1,000,000       ($)

Next bracket? (YES)
```

FIG. 6

```
                Pricing Wire Indicators for CHERYLTEST
   Enter/update order period: NO
     Enter orders on phone: (212) 806-8301
       Include MSRB message: YES   OS: PRELIMINARY
    Size of deal approximate: YES   Show AMT status if not AMT? NO
       Include scale totals: NO
       Include coupon for NROs: NO    Include price for NROs: NO
       Include coupon for SNAs: NO    Include price for SNAs: NO
     Include principal amounts: YES
  Include approx $/yield price: YES   Serials/Terms/Both: BOTH    PTC ovr: N/A
   Include priority paragraph: NO
Display coupon for Sealed Bid: NO    Display price for Sealed Bid: NO
         Include balance info: NO
        Include cusip numbers: NO
   Include spread detail info: NO    Separate or Weighted average: N/A
       Include Blue Sky info: NO    Concess Unit Bonds: _  Mults: _
       Include presale orders: NO    Include Free Text: NO
       Include Bid Parameters: NO
      Include coupon for FNMAs: NO    Include price for FNMAs: NO
               Indicate FNMA: NO Use <RETURN> and arrow keys to move around, <LINE FEED> to save data and/or quit.
```

FIG. 8

```
Xyplex - Reflection for UNIX and Digital
File  Edit  Connection  Setup  Macro  Window  Help ORDER PERIOD ENTRY FORM FOR : CHERYLTEST
                                        Time Zone: EASTERN
Order Monitor: YES  Roles: ___  Display? NR    Combine MM/YY? NO
    OP? NO   Show Actual? YES  Order Detail Report? YES
  ORder Period # ____
     Presale? ___    Type: _____       Order Types Accepted:
Order period begins: date: _____ time: _____ _____
               ends: date: _____ time: _____
Terminate all maturities? ___           Max orders amount: _____

Maturities      Accepting Orders?    Time Stamp Terminated
_____       _____            _____
_____       _____            _____
_____       _____            _____
_____       _____            _____

Create/edit wire? ___
Display wire? ___
Broadcast wire? ___
Verification wire? ___
Use <RETURN> and arrow keys to move, <LINE FEED> to save data and/or quit.
```

FIG. 9

THOMSON MUNICIPAL MARKET MONITOR $100,000,000
KATHERINETEST

08/21/2001 11:40AM

| Maturity | Coupon | Amount ($000's) | Total Orders ($000's) | Total Orders ($000's) | Total Member ($000's) | Balance ($000's) |
|---|---|---|---|---|---|---|
| 06/01/2002 | 4.050 | 500 | 950 | 0 | 950 | -450 |
| 06/01/2003 | 4.100 | 500 | 55 | 30 | 25 | 445 |
| 06/01/2004 | 4.150 | 500 | 1,100 | 0 | 1,100 | -600 |
| 06/01/2005 | 4.200 | 500 | 100 | 0 | 100 | 400 |
| Total | | 2,000 | 2,205 | 35 | 2,175 | -205 |

THOMSON FINANCIAL
MUNICIPALS GROUP

*Thomson Municipal Market Monitor*
©1995-2001 Thomson Financial Municipals Group. All rights reserved. Trademarks page.(S2)
TM3 Client Services 1-800-367-8215, 8:00 a.m. to 6:00 p.m. EST.
Please send comments to webmaster@tm3.com
Tue Aug 21 11:40:09 2001

FIG. 13

TM3: Thomson Municipal Market Monitor - Microsoft Internet Explorer

File  Edit  View  Favorites  Tools  Help

Back  Forward  Stop  Refresh  Home  |  Search  Favorites  History  |  Mail  Print  Edit  Discuss Address: k/main.htm?page=MonitorStatus&MAINCUST=STONEYOU&DEALNUM=31245&DEAL=KATHERINETEST

THOMSON MUNICIPAL MARKET MONITOR

News | Market Data | Datcomp Syndicates
Primary Markets | Municipal Market Data | Additional Services
Secondary Markets | Muni Data/Analysis | Reference Calendar | Details | Refresh Monitor | Documents CUSIP9 Search

$500,000 Maturity due 06/01/2002

| Buyer | Order Type | Amount ($000's) | Retail | Date/Time |
|---|---|---|---|---|
| Alliance Cal T/E Fund | MEM | 250 | NO | 07/30/2001 12:22PM |
| Co-Manager, Test Code | MEM | 100 | YES | 07/30/2001 12:22PM |
| Allstate Long Term Fund | MEM | 500 | NO | 07/30/2001 12:21PM |
| Allstate Long Term Fund | MEM | 100 | NO | 07/30/2001 12:16PM |
| | | Total: 950 | | |

THOMSON FINANCIAL
MUNICIPALS GROUP

Thomson Municipal Market Monitor.
©1995–2001 Thomson Financial Municipals Group. All rights reserved. Trademarks page.(S2)
TM3 Client Services 1-800-367-8215, 8:00 a.m. to 6:00 p.m. EST.
Please send comments to webmaster@tm3.com.

Tue Aug 21 11:45:43 2001

Start | Inbox-... | envelope... | TM3: Th... | Microsof...    11:45 AM

FIG. 14

FIG. 18  THE US MAP IS DISPLAYED. WE WOULD ONLY DISPLAY CITIES THAT HAVE ORDERS ASSOCIATED WITH THEM. IF THE USER CLICKS ON ANY CITY A SECOND WINDOW APPEARS (DISPLAYED ABOVE AS SAN FRANCISCO DISTRIBUTION CENTER). WE COULD THEN DETAIL THE ORDERS IN THIS BOTTOM FRAME.

COMPUTER CONCEPTUAL

FLOW OF POTENTIAL
COMPUTER PROCESS

CONCEPTUAL VIEW OF
MEMORY STORAGE MEDIUM

ISSUER MONITOR SYSTEM FOR MONITORING AND/OR ANALYZING FINANCIAL TRANSACTIONS AND METHOD OF USING THE SAME

CROSS-REFERENCE TO RELATED APPLICATION

This application claims priority from U.S. Provisional Application No. 60/283,335, filed Apr. 13, 2001, which is incorporated herein by reference.

BACKGROUND OF THE INVENTION

1. Technical Field

The present invention relates to security or financial transactions and, more particularly, to a system and method for allowing a security syndicate issuer to monitor syndicate transactions during the order and sale of the security syndicates.

2. Description of the Related Art

There are various types of security syndicate offerings conducted in the securities market. One type of security syndicate offering, for example, involves the sale of municipal bonds. During a security syndicate offering of municipal bonds, various transactions are conducted to solicit bids for, and facilitate the sale of the municipal bonds. These transactions can be very complex and time consuming because the security syndicate offering can be valued at, for example, over one (1) billion dollars. Furthermore, processing the security syndicate offering requires interaction between a large number of participants. In general, the participants form a syndicate group consisting of financial institutions, underwriters, etc. The syndicate group pool their resources to share the underwriting liability for a given security syndicate offering by a security issuer.

A security syndicate offering can include, for example, four general transaction periods, namely communication, pricing, order, and allotment. During the communication period, information regarding the details of the security syndicate offering, for example, is communicated to all members of the syndicate. Once the information has been received, the syndicate members make a commitment to purchase a portion of the transaction value. The pricing period represents, for example, the time it takes to negotiate or otherwise arrive at the terms for purchasing the security syndicates. For example, the terms can include the interest rates, maturities, etc. The order period begins after the pricing. During the order period, the syndicate members use their sales forces to contact financial institutions, asset managers, individual investors, etc. to solicit orders for the sale of the security syndicates. Finally, there is the allotment period, wherein a syndicate manager makes a decision as to which orders will actually be filled. This is necessary because there are times when the syndicate members receive more orders than the value of the security syndicate offering.

Transactions conducted during the security syndicate offering can have various degrees of importance to both syndicate and non-syndicate members. One such party (or member) is the security syndicate issuer. The issuer is the person, entity, municipality, etc. offering the security syndicates for sale. The issuer is particularly interested in the order period. The order period can provide an indication of how the security syndicates are selling. This will, in turn, allow the issuer to know if the security syndicates were appropriately priced and whether the syndicate members will be able to complete the sale of the security syndicate offering.

Traditionally, the issuer would periodically contact a lead syndicate member (e.g., a senior manager) and request an update on the number of bonds that have been sold. Availability of a senior manager depends on the type of security syndicate offering. In a negotiated bond offering, for example, there is only one senior manager responsible for overseeing the entire deal. In a competitive bond offering, multiple senior managers can share responsibility for overseeing the deal.

The frequency with which the issuer contacts the senior manager depends, in part, on the particular issuer. For example, one issuer may contact the senior manager two or three times throughout the day, while another issuer may contact the senior manager every hour or even more frequently. Another factor affecting the issuer is the speed at which the bonds are being sold. For example, the same issuer may contact a senior manager more frequently if the bonds do not appear to be selling quickly. In competitive deals, the issuer may contact multiple, or all, senior managers to determine status information on the deal.

The process of contacting a senior manager (or multiple senior managers) can be very time-consuming and tedious. For example, the senior manager must be prepared to provide updated information regarding sale of the bonds. Since the information may be changing dynamically, the senior manager must also devote time to tabulating the information. Consequently, resources will not be available to market and solicit the sale of bonds.

Various electronic systems currently exist for trading bonds and managing transactions associated with bond trading. For example, U.S. Pat. No. 5,915,209 to Lawrence, incorporated herein by reference, discloses a computer-implemented bond trading system. The system attempts to facilitate a private auction of bid wanteds between a central brokers' broker and multiple prospective bidders and to maintain a reference database of accurate bond lot descriptions.

FIG. 23 is a reproduction of a preferred embodiment of the system disclosed in the '209 patent (originally labeled FIG. 1). Referring to FIG. 23, a software-enabled, computer-implemented municipal bond trading system 310 is provided for use by SEC-registered municipal bond brokers firms to serve the community of SEC-registered securities brokerage firms who deal with the public, such as selling traders 314 and buying traders 312, for executing transactions in unlisted securities, especially municipal bonds, without disclosing the seller to the prospective buyer. The municipal bond trading system 310 enables a broker who deploys it to perform a centralized market-making function in a manner providing many of the advantages of a live exchange such as the New York Stock Exchange, without, in preferred embodiments, requiring an exchange license. Although the municipal bond trading system 310 is shown in FIG. 23 as occupying a central function between sellers such as selling trader 314 and buying traders 312, the municipal bond trading system 310 can include components running at the premises of buying traders 312 and at the premises of selling traders 314 to integrate both sellers and prospective buyers into a coherent market-making system.

A job lot 316 comprises a list of one or more bond lots, each of which is a bid wanted, offering or a dollar bond quote. "For sale" is an industry phrase which means that a seller has accepted a bid at a level reasonably close to the lot's value and will execute on the bid. A selling trader 314, who may be an owning institution or individual but is preferably an SEC-registered securities broker dealer, transmits one or more job lots 316 of bonds for sale to the municipal bond trading system 310 maintained by a broker, who functions as a "market-maker," at any time convenient to the selling trader 314.

Transmission of job lots 316 to the municipal bond trading system 310 can be accomplished in any conventional manner: written, faxed, telephoned, or electronically effected in a file that can be directly processed by the municipal bond trading system 310 via confidential e-mail, as are communications from the market-maker to the seller, over data lines 315. The seller can be computer-linked to the municipal bond trading system 310 on a LAN or a WAN.

After appropriate central processing employing the municipal bond trading system 310, bid wanteds are circulated to buying traders 312 in order to solicit bids 318. Bids 318 are received from one or more buying traders 312 and transmitted to the seller by any suitable means, such as fax or computer network, as described above, for further processing. If the selling trader 314 accepts the bid 318, the brokers' broker marks the lot "for sale" and completes the execution, preferably with the assistance of the municipal bond trading system 310, and then transmits customary buy and sell tickets 322 to the selling trader 314 for their internal processing. If traders are utilizing the system on their workstations, they will execute a "buy" utilizing the program while the broker executes a "sell."

The system can be operated as an exchange, providing a direct transaction between a selling trader 314 and a bidding trader 312, conducted through the intermediary of the trading system 310. The double step required in conducting a buy-sell transaction with both the selling trader 314 and the buying trader 312, can be eliminated. The trading system 310 may also receive bid wanteds in electronic form, without vocal communication, and system-select the best bid for entry and referral to the selling trader 314 for acceptance, which electronic non-vocal automated trading procedure currently requires an exchange license. The system can be tailored to transmit information of the transaction to the trader's in-house processing system for proper record-keeping and accounting and to maintain an inventory of bond lots in position for the trader.

The municipal bond trading system 310 herein facilitates fulfillment of this requirement by enabling rapid distribution of job lots 316 to a wide base of customers, selling traders 312, and by providing quick and efficient means for evaluating, collating and transmitting even a large number of bids 318 to the seller for further action. Before a trade is executed, a municipal bond must be identified with a Central Unified Security Identification Process number, herein referred to as "CUSIP (trademark)" issue identification number. CUSIP is a registered trademark of the American Bankers Association ("ABA"). The bond lot must also have an authentic description and a par value, usually some thousands of dollars, describing the size of the lot. Unlisted bond descriptions are subject to change at any time. For example, bond ratings are continually changed by rating agencies, and a bond may be called in for repayment on as little as thirty days' notice. Ratings and calls are an essential part of the description of a security and can dramatically affect the character of the investment. It is accordingly highly desirable to include such changes of description in each bid wanted before distributing it, which presents a problem.

To provide contemporaneous descriptions rapidly, in a manner suitable for processing lots in volume, a security master database 324 is provided, wherein bond descriptions are stored cumulatively, whenever the municipal bond trading system 310 encounters them, to be available for future use. The security master database 324 can be primed or supplemented with preferred lists of bond descriptions and has no particular limits, but it is much smaller than the reference database 322, thus enabling a faster search and access capability. For municipal bond trading, the reference database 322 is preferably the KIS database.

Once prepared, the bid wanted form 326 is distributed to the buying traders 312 to enable them to bid in a timely manner. Bids are first solicited, and if necessary, collected centrally, and then evaluated to determine the high bidder. Following this process, a compilation of bids is transmitted to the selling trader 314 for action. These steps are accomplished in a silent auction, conducted electronically or on paper without the necessity of voiced person-to-person communication modes, such as telephone calls. In this silent auction, each bid wanted is provided with a bidding deadline and is broadcast to reach multiple buying traders 312 prior to that bidding deadline. Traders 312 wishing to bid on the lot offered are required to return a completed bid wanted form 328 to the central municipal bond trading system 310 prior to the deadline if the bid is to be considered. Bidding closes when the deadline passes. After acceptance of a high bid by the selling trader 314 and the completion of any closing formalities, a bought-from ticket 334 is system-prepared and transmitted to the buyer for their records and processing, preferably electronically.

Bidding traders 312 are linked to the municipal bond trading system 310 over a computer network so that bidding deadline alerts can be overlaid, or otherwise displayed on a buying trader's screen at various times throughout the auction process to advise of the approaching commencement of an auction on a particular lot, to warn of expiration of the time limit, and to provide interim advisories as the auction proceeds. Such alerts are preferably displayed on a system-wide basis on all selected and operational networked screens including those of brokers working with other applications on-screen at the time. If desired, bidding trader modules of the municipal bond trading system 310 software can include switches or filters permitting the user to choose which alerts should be flashed on-screen or which should be allowed to interrupt other applications.

An on-screen bidding advisory message requires action by the bidding trader 312 to remove it, such as pressing a particular key, and the advisory may include options, for example, "Display bid wanted form?", if the form is not already on-screen. The system utilizes fax transmissions of bid wanted forms 326 to a specified group of buying traders 312 who can receive the bid wanted form 326 on paper, by computer or in both ways. This method of transmission is also suitable for distributing bid wanted forms 326 to any individual buying trader 312. In preparing job lots 316 for fax broadcasting, the municipal bond trading system 310 organizes all active job lots 316 in a queue so that the broker can designate, or "tag," selected lots for faxing. The system sorts tagged lots for faxing by auction time, and sends them to a fax service 330 at a predetermined interval before the auction commences.

The bid wanted form 326 contains the full particulars of each bid wanted lot, including its CUSIP (trademark) number and description, state of origin, maturity, par amount, and coupon values (yield and concession particulars, net yields, and dollar, gross and net dollar price) if appropriate. For use in a fax-broadcast marketing system, the form preferably also includes blanks completable by a bidding trader with bid particulars, yield, dollar or other amount, as appropriate, and bidder identifiers, including the name of the bidding trader. Yields and other calculable values can of course be system-calculated and automatically posted from base data. A buying trader 312 can quickly write minimal bid information on a hard copy of such a bid wanted form 326, sign it, and fax it back to the market-maker, who receives a signed bid with full and accurate lot particulars complying with regulatory requirements and which does not need to be checked, verified or completed.

U.S. Pat. No. 5,809,483 issued to Broka et al., incorporated herein by reference, discloses an on-line transaction processing system for bond trading. The system allows for monitoring of information regarding debt securities and reporting trades in the debt securities market. FIG. 24 is a reproduction of a preferred embodiment of fixed income pricing system (FIPS) as disclosed in the '483 patent (originally labeled FIG. 1).

As shown in FIG. 24, the FIPS processing system 400 includes business functions layer 410, infrastructure layer 420, and platforms layer 460. Business functions layer 410 provides the basic services accessed by users and includes the following services: Trade Reports 411, Market Services Control 412, Quotes 413, Issues 414, News 415, Participants & Users 416, and Statistics 417.

Infrastructure layer 420 includes the communication mechanisms and other tools that allow the various FIPS processes to work together. Infrastructure layer 420 includes workstation services module 421, network services module 430, and host services module 440. Workstation services module 421 includes those services required to use a workstation and include: User Interface Management 422, Information Model 423, Host Connection 424, Broadcast Receiver 425, Message Handling 426, Logging 427, and Utilities 428.

Network services module 430 includes those services which provide access to the entire network. These include: Routing 431, Message Transfer 432, and Filtering 433. Host services module 440 includes those services provided for the FIPS host and include: Security 441, Beginning-of-Day & End-of-Day 442, Message Handling 443, Communication 444, Broadcast 445, Timer 446, Logging 447, Message Naming 448, bond quotation dissemination system (BDQS) 449, computer-to-computer interface (CTCI) 450, and Standard & Poor's (S&P) Data Loading 451.

During most system interactions, one of the services in infrastructure layer 420 will interact with one of the functions in business functions layer 410. For example, the Security service 441 works with the Participant & User business function 416 to authorize and authenticate users when they log on. Different services in infrastructure layer 420 may also communicate with each other. For example, the Broadcast service 445 works with the Communication service 444 to send messages to multiple platforms including PC/Windows 461 and Sun/Unix 462. Business functions can have relationships with each other as well. For example, FIPS system administrators may use Market Service Control 412 with the Trade Reports 411 to restrict a user's ability to generate trade reports.

The previously described systems appear beneficial for addressing specific problems in the financial market. For example, the '483 patent addresses problems associated with monitoring debt security information and reporting trades in the debt securities market. However, existing systems, while capable of addressing some problems, simply do not address the problems we have discovered associated with security syndicate offerings such as, for example, allowing an issuer to view the progress of sales of security syndicates or access information conventionally available only from a senior manager.

Accordingly, we have determined that there exists a need for a system that reduces the difficulties encountered by issuers during security syndicate offerings.

We have also determined that there exists a need for a system capable of allowing an issuer to independently monitor the status of security syndicate sales.

We have also determined that there exists a further need for a system which does not impose on a senior manager's duties during a security syndicate offering.

We have also determined that there exists a still further need for a system capable of monitoring transactions during a security syndicate offering.

SUMMARY OF THE INVENTION

It is therefore one feature and advantage of the present invention to address at least some of the shortcomings of the prior art in reducing the difficulties encountered by issuers during security syndicates.

It is another optional feature and advantage of the present invention to provide a system capable of allowing an issuer to independently monitor the status of security syndicate sales.

It is yet another optional feature and advantage of the present invention to provide a system which does not impose on a senior manager's duties during a security syndicate offering.

It is a further optional feature and advantage of the present invention to provide a system capable of monitoring transactions during a security syndicate offering.

The foregoing, and various other needs, are addressed, at least in part, by the present invention, wherein a security syndicate transaction system provides information regarding security syndicate offerings to an issuer.

According to one aspect of the present invention, a method of monitoring the flow of transactions during a security syndicate offering or other financial transaction comprises the steps: accessing, by an issuer, a security syndicate transaction system or other financial system; displaying one or more active security syndicate offerings or other offerings to the issuer, each of the one or more active security syndicate offerings having a predetermined value; selecting a particular security syndicate offering or other offering from the one or more active security syndicate offerings; and displaying information associated with the selected security syndicate offering to the issuer. Accordingly, an issuer is capable of independently monitoring transactions during the security syndicate offering. In particular, such a method advantageously eliminates, or at least minimizes, the amount of contact necessary between the issuer and the senior manager or other coordinator in order to obtain transaction information. Thus, the senior manager's time can be more efficiently used for controlling and managing the security syndicate offering.

According to an optional embodiment of the present invention, for each security syndicate offering, a value, a description, a geographic origin, a financial rank, and a senior manager can also be displayed. In addition, the security syndicate offerings can be in the form of financial bond issues offered for sale by the issuer. In such situations, the information associated with the selected security syndicate offering can optionally include at least one maturity date, a monetary amount for each maturity date, a coupon value for each maturity date, a unit price per bond in each maturity date, a concession value, and a take down value. Accordingly, the issuer is capable of obtaining significant information pertaining to the security syndicates. Further embodiments of the invention provide for an issuer associated with a municipality offering municipal bond issues.

According to another optional embodiment of the present invention, it is determined whether an expiration time has been reached for the selected security syndicate offering. If an expiration time has not been reached, then the information displayed for the selected security syndicate offering is updated. The information can be updated in a variety of ways including, for example, in direct response to a request or input from the issuer. Alternatively, the information can be updated automatically in response to data received by the security syndicate transaction system regarding the selected security syndicate offering. Another optional feature of the present invention provides an indication that the selected security syndicate offering has been closed, if it is determined that the expiration time has been reached.

According to an optional embodiment of the present invention, information regarding the selected security syndicate offering can be correlated for purposes of generating reports. The correlated information can include, for example, the time at which orders are placed, the size of the orders, and the geographic origin of the orders. The reports generated can contain information regarding, for example, the total number of orders received, the rate at which the orders are being received, or the geographic distribution of the orders received. The reports can also be generated in real-time. Further optional aspects of the invention provide for identification of one or more trends in the flow of transactions based on the reports generated. Depending on the specific trend identified, the senior manager responsible for overseeing the security syndicate offering can be contacted so that certain values effecting the trends can be adjusted.

According to another aspect of the present invention, a system is provided for monitoring the flow of transactions during a security syndicate offering. The system monitors one or more security syndicate offerings offered for sale by an issuer, and comprises a security syndicate transaction system. The security syndicate transaction system includes subsystems for storing and receiving information regarding the security syndicate offerings. In additions, the subsystems also function to process information pertaining to transactions performed during the security syndicate offering. An issuer, remotely located from the security syndicate transaction system, is capable of receiving information associated with the security syndicate offerings from the security syndicate transaction system and transmitting information thereto. According to such an arrangement, an issuer is capable of using the issuer computer to access relevant information regarding the security syndicate offering. This feature advantageously minimizes the number of update requests that are conventionally required from the senior manager by the issuer. Thus, the senior manager is free to focus on duties pertaining to management of the security syndicate offering, while the issuer can independently obtain necessary updates regarding the flow of transactions.

According to another aspect of the present invention, an arrangement is provided for monitoring the flow of transactions during a security syndicate offering. The arrangement includes one or more security syndicate offerings offered for sale by an issuer, and a security syndicate transaction system configured for storing and receiving information regarding the security syndicate offerings. The security syndicate transaction system is also configured for processing information pertaining to transactions performed during the security syndicate offering. An issuer computer, remotely located from the security syndicate transaction system, is provided for allowing the issuer to receive information associated with the security syndicate offerings from the syndicate transaction system and transmit information thereto.

There has thus been outlined, rather broadly, the more important features of the invention and several, but not all, embodiments in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

FIG. 4 illustrates a deal menu for entering information regarding a security syndicate offering;

FIG. 5 illustrates series menu for entering various dates regarding the security syndicate offering;

FIG. 6 illustrates a syndicate list menu for establishing and viewing participation of syndicate members;

FIG. 8 illustrates a wire menu usable by a senior manager to establish a pricing wire;

FIG. 9 illustrates an order menu useable by an issuer to control information available to syndicate members during the order period;

FIG. 13 illustrates a monitor which provides detailed transaction information regarding each maturity in the security syndicate offering;

FIG. 14 illustrates a maturity detail menu that displays information regarding orders placed for each maturity;

DETAILED DESCRIPTION OF THE INVENTION

Figure 1:
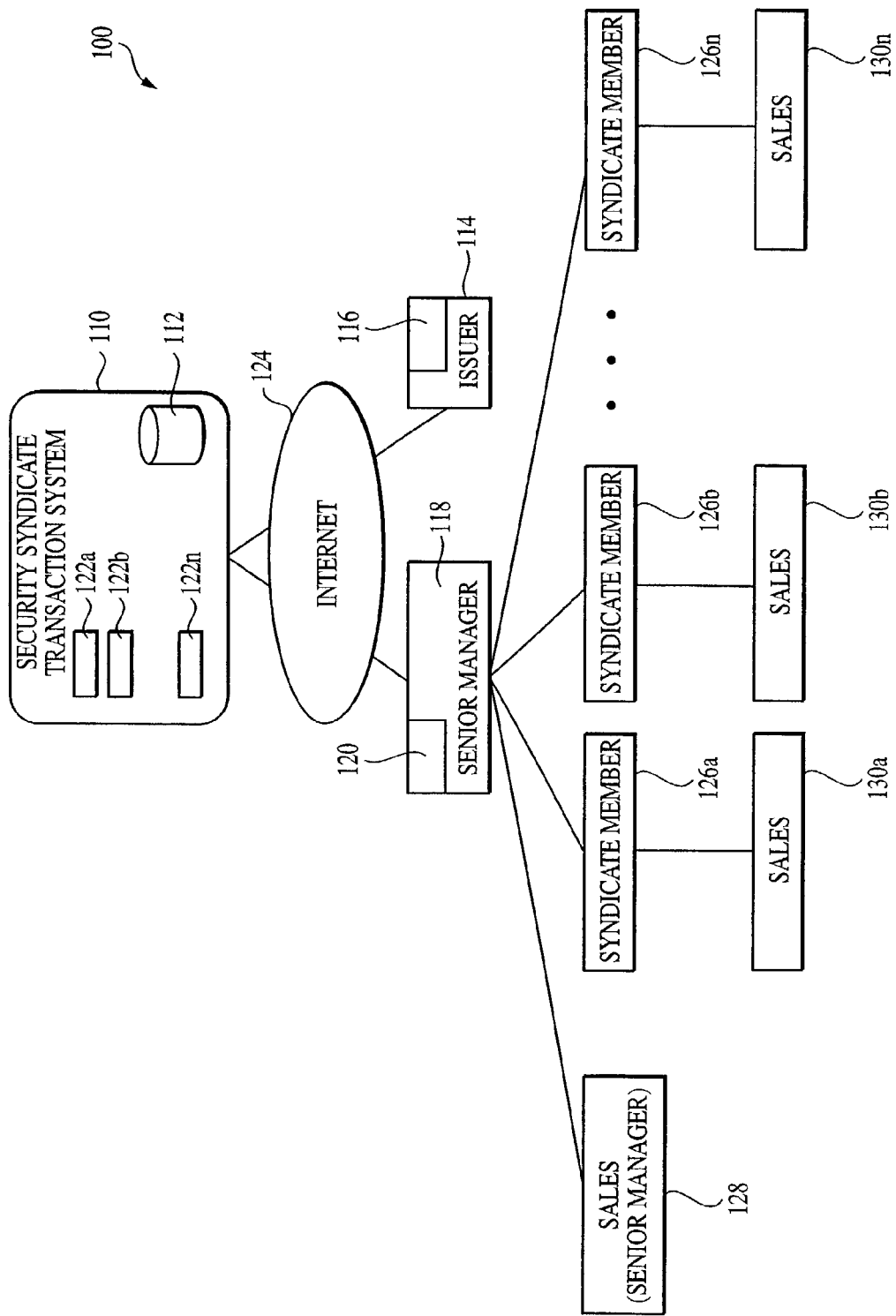
FIG. 1 is a block diagram illustrating relationships and the flow of transactions during a security syndicate offering according to an embodiment of the present invention.

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Prior to describing the details of the invention, a brief discussion of some of the notations and nomenclature used in the description will be presented. Next, a description of exemplary hardware useable in practicing the invention will be presented.

Notations and Nomenclature

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are preferably machine operations, although the operations may also be manual in alternative embodiments. Useful machines for performing the operation of the present invention include general purpose digital computers or similar devices.

The present invention also relates to apparatus for performing these operations. This apparatus may be specially constructed for the required purpose or it may include a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

Security Syndicate Transaction Monitoring System

Referring to the drawings, and initially to FIG. 1, a system 100 is shown for monitoring the flow of transactions during a security syndicate offering. The transaction monitoring system 100 (or issuer monitor) includes a security syndicate transaction system 110, an issuer system 114, and a senior manager system 118. The security syndicate transaction system 110 contains a plurality of subsystems (not all shown), such as the illustrated data storage device 112, for storing and receiving processed information regarding security syndicate offerings. The security syndicate transaction system 110 also includes processing subsystems 122a-122n (collectively 122), that process information pertaining to transactions performed during the security syndicate offering. As used herein, a security syndicate refers to financial securities (or other financial instruments) offered for sale, and subsequently sold to buyers. A security syndicate offering refers to any procedure during which the security syndicates are offered for sale to generate funds and/or revenue. The financial instruments include, but are not limited to, municipal bonds, short-term bonds, long-term bonds, stocks, etc. The security syndicate transaction system 110 can also include a computer (not shown) functioning as a server for interacting with both internal and external subsystems.

The issuer system 114 and senior manager system 118 each have access to at least one computer system such as issuer computer 116 and senior manager computer 120. The issuer computer 116 and senior manager computer 120 execute predetermined program commands for interfacing with the security syndicate transaction system 110, and for participating in the security syndicate offering. The issuer system 114 and senior manager system 118 access the security syndicate transaction system 110 over a communication network 124 such as, for example, the Internet. It should be noted, however, that various other networks can be used including, but not limited to, direct-dial closed networks, private local area networks (LANs), wide area networks (WAN), etc.

During the security syndicate offering, the issuer system 114 offers one or more security syndicates for sale. This offer can be presented in various forms, including a message communicated to the security syndicate transaction system 110. The message would contain all the necessary information for processing the security syndicate offering and subsequently selling the security syndicates (e.g., financial instruments). The information can be stored on the data storage subsystem 112 of the security syndicate transaction system 110 where it can be restrictively accessed by the senior manager system 118. The restrictive access can be controlled, for example, by means of a username and password that uniquely identifies the senior manager system 118. Thus, it is possible for the transaction monitoring system 100 to support multiple senior managers 118 and multiple issuers 114 simultaneously interacting with the security syndicate transaction system 110. Each senior manager system 118 and/or issuer system 114 would be restricted to viewing security syndicate offerings of which they are a part, thus addressing privacy and/or security concerns.

The senior manager system 118 is part of a syndicate group containing various entities. However, the senior manager system 118 is responsible for managing transactions that ultimately lead to the sale of the security syndicates. Consequently, the senior manager system 118 is the only entity in the syndicate group that can access the security syndicate transaction system 110. As previously indicated, the syndicate group includes a plurality of syndicate members 126a-126n (collectively 126) that share liability for the security syndicate offering. The syndicate group can also include a sales desk 128 operated by the senior manager's staff for soliciting sale of the security syndicates from the security syndicate offerings. Likewise, the syndicate members 126 can include their own sales divisions 130a-130n (collectively 130) that solicit sale of the security syndicates from various institutions and/or investors. The syndicate members 126 can optionally solicit sales from the institutions directly without the use of a sales department 126.

During the security syndicate offering, all data relating to the order and/or sale of the security syndicates are transmitted to the senior manager system 118. This information is subsequently transmitted from the senior manager system 118 across the communication network 124 to the security syndicate transaction system 110. The senior manager system 118 is also capable of transmitting information regarding the security syndicate offering to the syndicate members 126.

The issuer system 114 communicates with the security syndicate transaction system 110 in order to monitor transactions being conducted during their particular security syndicate offerings. As previously stated, the senior manager system 118 transmits data corresponding to such transactions to the security syndicate transaction system 110. Accordingly, this information is accessible by the issuer system 114 in order to monitor the security syndicate offering. The data corresponding to the transactions is preferably displayed on the issuer's computer 116 and automatically updated in real time. For example, every time the senior manager system 118 transmits information to the security syndicate transaction system 110 regarding a transaction, that data would be automatically transmitted to the issuer's computer 116 to update the records. Alternatively, the issuer system 114 can manually select to update information regarding the security syndicate offering. Such a procedure would cause the issuer's computer 116 to transmit a message to the security syndicate transaction system 110, and access the most recently uploaded data.

According to one embodiment of the present invention, the issuer's computer 116 can be configured to correlate data received from the security syndicate transaction system 110 and generate reports that represent the progress of transactions during the security syndicate offering. The reports can be in various forms including, for example, tables, graphs, etc. In addition, the issuer's computer 116 can be optionally configured to process the data received from the security syndicate transaction system 110 and identify certain trends such as a reduction in the rate of orders being submitted, an increase in the rate of orders being submitted, a change in the relative distribution of orders being received, etc. The trends can be generally considered as indicators of the progress of the security syndicate offering. Based on these identified trends, the issuer system 114 can optionally contact the senior manager system 118 in order to incorporate changes designed to achieve predetermined results. For example, if an identified trend shows that the number of orders being received, or the rate at which orders are being received is going down, the issuer system 114 may wish to contact the senior manager system 118 to discuss a change in pricing that would make the security syndicates more attractive to buyers and/or investors. For example, if the security syndicates are municipal bonds, the issuer system 114 might suggest a reduction in the interest rate and/or a change in the maturity structure of the bonds. In essence, the issuer system 114 will attempt to identify negative trends in the sale of the security syndicates, and take appropriate steps to correct those trends. Similarly, if the issuer system 114 determines the rate of sale of the security syndicates to be too high, the issuer system 114 may contact the senior manager system 118 and, for example, increase the interest rate of the bonds.

Figure 2A:
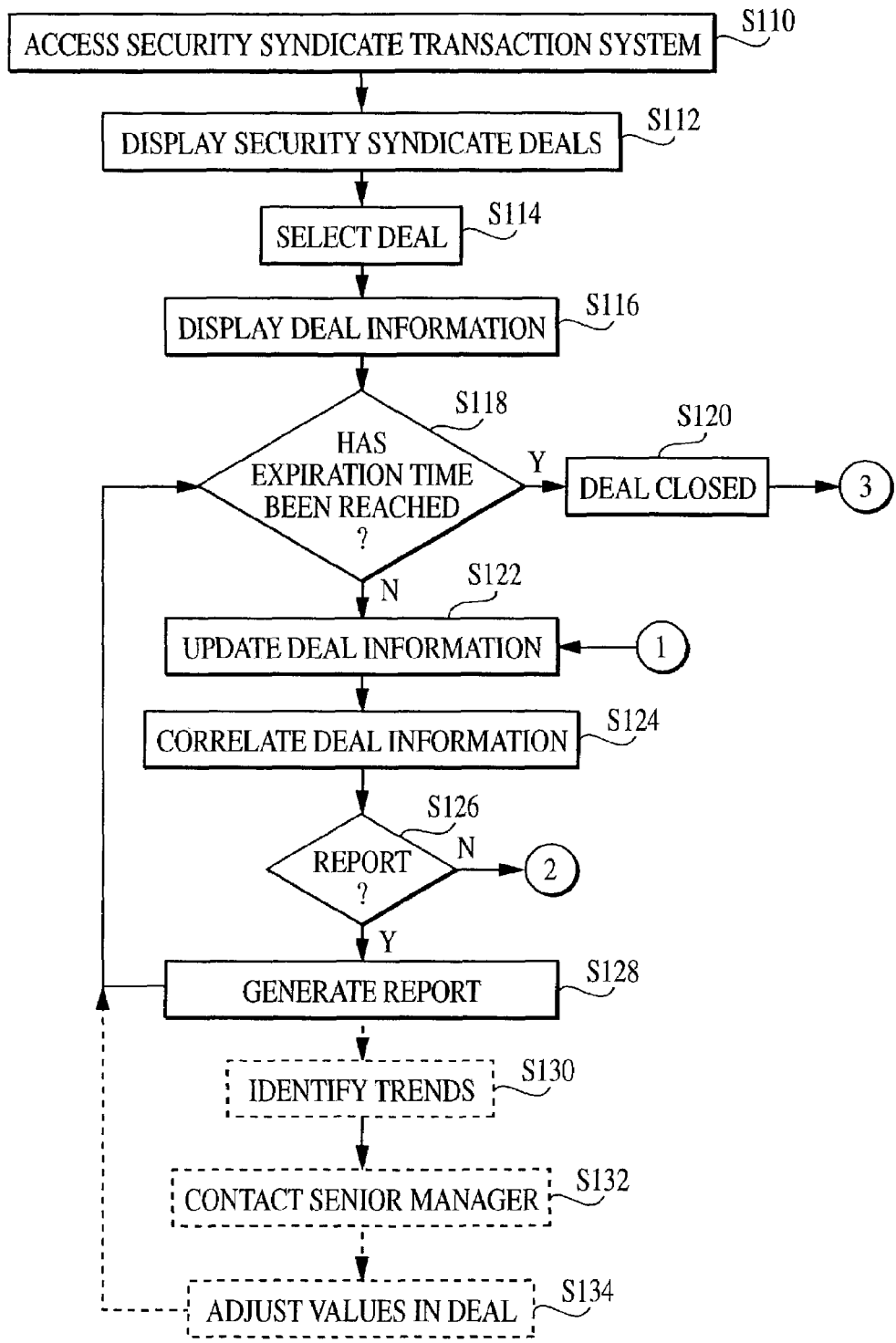
FIGS. 2A and 2B are a flow chart illustrating the steps performed while monitoring the flow of transactions during a security syndicate offering.
Figure 2B:
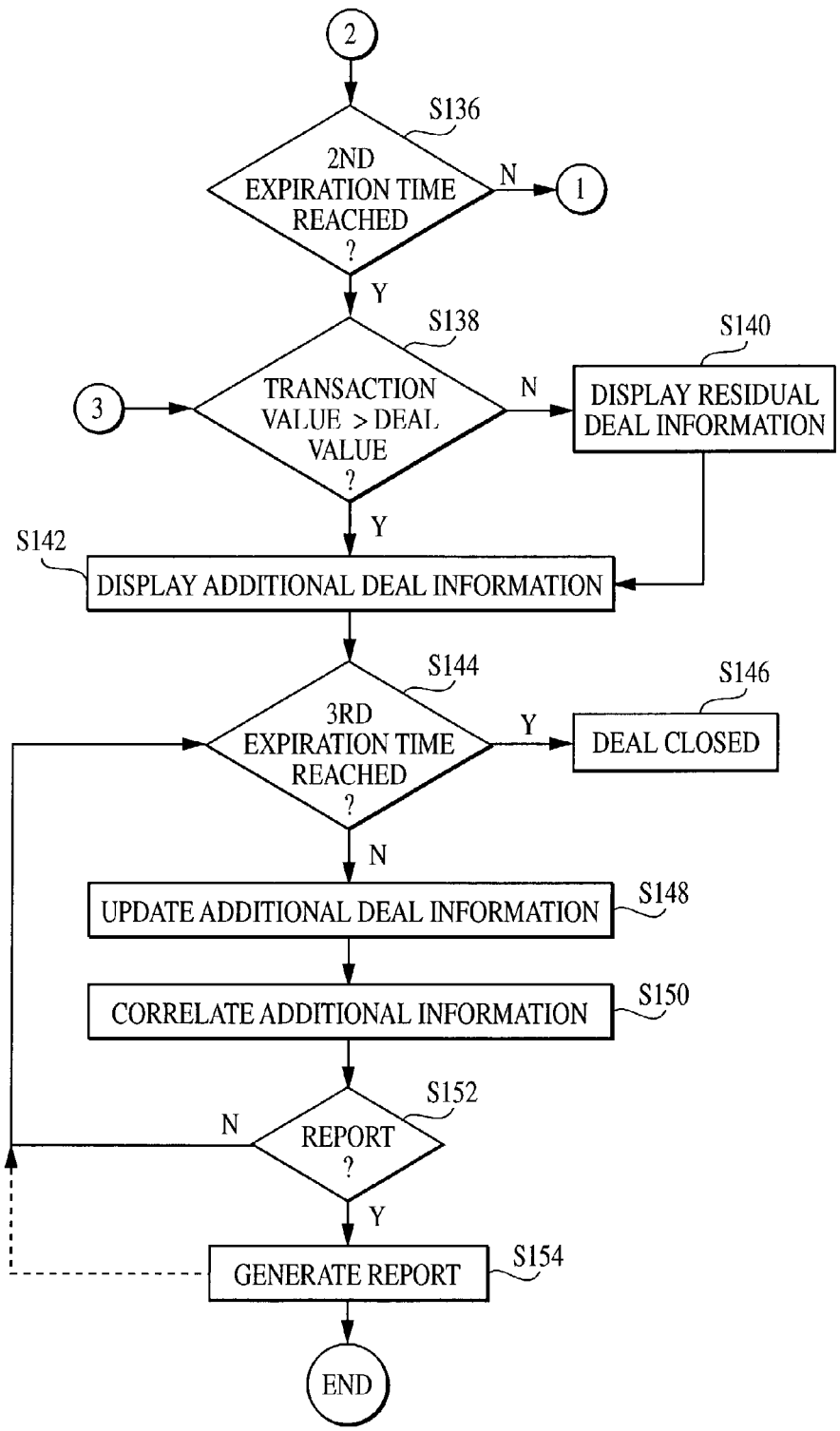

Turning now to FIGS. 2A and 2B, a flowchart is illustrated for displaying exemplary steps performed when monitoring the flow of transactions during a security syndicate offering. During the security syndicate offering, the senior manager system 118 principally interacts with the security syndicate transaction system 110 and the syndicate members 126. However, the issuer system 114 also has an ability to monitor the transactions being conducted, as will be described further hereinbelow. While the below described steps are in a particular sequence, it is possible to alter the sequence of steps and/or perform some or many of the steps in parallel. Further, the specific exemplary steps/systems described herein are described in connection with an issuer syndicate financial transaction. However, the present invention may easily be adapted to a variety of financial transactions, as necessary. At step S110, the issuer system 114 accesses the security syndicate transaction system 110. As previously stated, this step can be performed using the issuer's computer 116 to contact the security syndicate transaction system subsystems via the communication network 124. Upon contacting the security syndicate transaction system 110, the issuer system 114 can optionally be requested to supply a username and password that uniquely identifies the issuer system 114 and restricts the information accessible by the user.

At step S112, the current security syndicate offerings available from the issuer system 114 are displayed on the issuer's computer 116. Depending on the particular issuer system 114, there may be one or more security syndicate offerings available at any given time. According to one embodiment of the present invention, the security syndicate offerings can be presented in the form of a calendar menu displaying one or more security syndicate offerings available from the issuer system 114. The calendar menu can also display general information regarding each security syndicate offering, such as the value, closing date, and a brief description. At step S114, the issuer system 114 selects a particular security syndicate offering to monitor. Depending on the particular computer software being used by the issuer system 114, the security syndicate offering can be selected, for example, using a graphical input/selection device such as a mouse or stylus, or by entering a predetermined keystroke or command using the keyboard.

At step S116, the issuer's computer 116 displays deal information corresponding to the selected security syndicate offering. The deal information can include, for example, the closing date, financial structure, rating, etc. for the selected deal. At step S118, it is determined whether an expiration time has been reached. The expiration time corresponds to the time at which the security syndicates are no longer available for sale. If the expiration time has been reached, then the selected security syndicate offering is identified as being closed (step S120), and control passes to block 3. If the expiration time has not been reached, then the deal information on the issuer's computer 116 is updated.

At step S124, data received for the deal information is correlated. Correlation of the received data can vary depending on the particular security syndicate offering and issuer system 114. In essence, the issuer system 114 is free to dictate the type of information which they seek while monitoring transactions. Thus, one issuer may desire that the correlated data quickly provide an indication of the number of security syndicates being sold. Another issuer may require that the correlated data quickly provide an indication of the rate at which the security syndicates are being sold. Yet still another issuer may require that the correlated data quickly identify the geographic distribution for sales of the security syndicates.

At step S126, the issuer system 114 decides if a report should be generated. If no report is desired at the time, then control passes to block 2. If, however, the issuer system 114 would like to prepare a report, then control passes to step S128 where the report is generated. The reports can also vary depending on the particular issuer's requirements, and are primarily intended to present information that will assist the issuer system 114 in following and understanding the progress of transactions during the security syndicate offering. For example, one embodiment of the present invention provides for reports that present a graphical analysis of the correlated data. Thus, the report can optionally correspond to the manner in which the data is correlated. At this point, control can return to step S118 where it is again determined if the expiration time has been reached.

According to one embodiment of the present invention, after generating the reports at step S128, control passes to step S130. At step S130, the issuer system 114 and/or issuer's computer identifies trends in the report generated. As previously indicated, the trends can be considered as indicators of the progress of the security syndicate offering. Depending on the particular trend identified, the issuer system 114 may optionally contact the senior manager system 118 at step S132. At step S134, the senior manager system 118 can adjust various values in the security syndicate offering to make the security syndicates either more attractive or less attractive to potential buyers. These adjustments in values are made based, at least in part, on information and/or permission received from the issuer system 114. After the values have been adjusted, control returns to step S118. It should be noted, however, that the senior manager may independently adjust these values without contacting the issuer, depending on the particular security syndicate offering and the relationship with the issuer.

Referring to FIG. 2B, if the issuer system 114 did not request a report at step S126, then control would now pass to step S136 (from control block 2). At step S136, it is determined whether a second expiration time has been reached. The second expiration time corresponds generally to a time frame during which orders for the security syndicates will be accepted. This often referred to as the order period. If the second expiration time has not been reached, then control passes to block 1. Block 1 returns control to step S122 and the process continues as previously discussed.

If the second expiration time has been reached, then at step S138, it is determined whether the current transaction value is greater than the security syndicate offering value. The transaction value corresponds to the monetary value of the security syndicates which have successfully been sold. The security syndicate offering value corresponds to the total monetary value of the security syndicate offering. Referring additionally to FIG. 2A, if it was determined at step S118 that the expiration time had been reached, then the deal would be closed and control would have passed to block 3. As shown in FIG. 2B, block 3 directs control to step S138. If the transaction value is not greater than the security syndicate offering value, then control passes to step S140.

At step S140, information is transmitted to the issuer's computer 116 so that the issuer system 114 may view a display of residual deal information. The residual deal information will generally correspond to security syndicates, or the amount of the security syndicates, that have not been sold after the security syndicate offering is closed. Control then passes to step S142. In addition, if the transaction value was determined to be greater than the security syndicate offering value, then control would also have passed to step S142. At step S142, information is transmitted to the issuer's computer 116 so that additional deal information can be displayed to the issuer system 114. The additional deal information corresponds to allotment information for the sale of the security syndicates. The additional deal information can include, for example, the names of the financial institutions that are purchasing the security syndicates and the value of the purchases.

At step S144, it is determined if a third expiration time has been reached. The third expiration time generally corresponds to the end of an allotment period for allotting the security syndicates to various institutions and/or investors. If the third expiration time has been reached, then the security syndicate offering is closed (step S146). If the third expiration time has not been reached, then control passes to step S148. At step S148, data is transmitted to the issuer's computer 116 to update the additional deal information. At step S150, the issuer system 114 and/or issuer's computer 116 correlate the additional deal information. At step S152, the issuer system 114 determines if a report should be generated. If a report should be generated, then control passes to step S154. Otherwise, if a report will not be generated, then control passes to step S144 where it is again determined if the third expiration time has been reached. Once the report has been generated at step S154, the process can either end, or optionally return to step S144.

As previously discussed, data can be transmitted to the issuer's computer 116 for purposes of updating the deal information and the additional deal information, either automatically or manually. For example, automatic updating would occur by the security syndicate transaction system 110 transmitting the updated data to the issuer's computer 116 every time the senior manager system 118 transmits transaction data to the security syndicate transaction system 110. Alternatively, the issuer system 114 can select a refresh button on the computer display to manually request transmission of updated data from the security syndicate transaction system 110.

One application of the present invention involves its cooperative use with transaction systems such as the standard Dalcomp Municipal Bookrunning and Wires System (the "bookrunning system"), developed by Dalcomp, a division of Thomson Financial Municipals Group. The bookrunning system is used to control the flow of information between syndicate members 126 during security syndicate offering. The bookrunning system provides the senior manager system 118 with at least some of the tools necessary to configure, manage, and process the security syndicate offering. Thus, the bookrunning system would provide the senior manager system 118 with an ability to collect and enter data pertaining to the syndicate group and the security syndicate offering. Once the data has entered, the present invention can be used by the issuer system 114 to monitor the flow of transactions.

Figure 3:
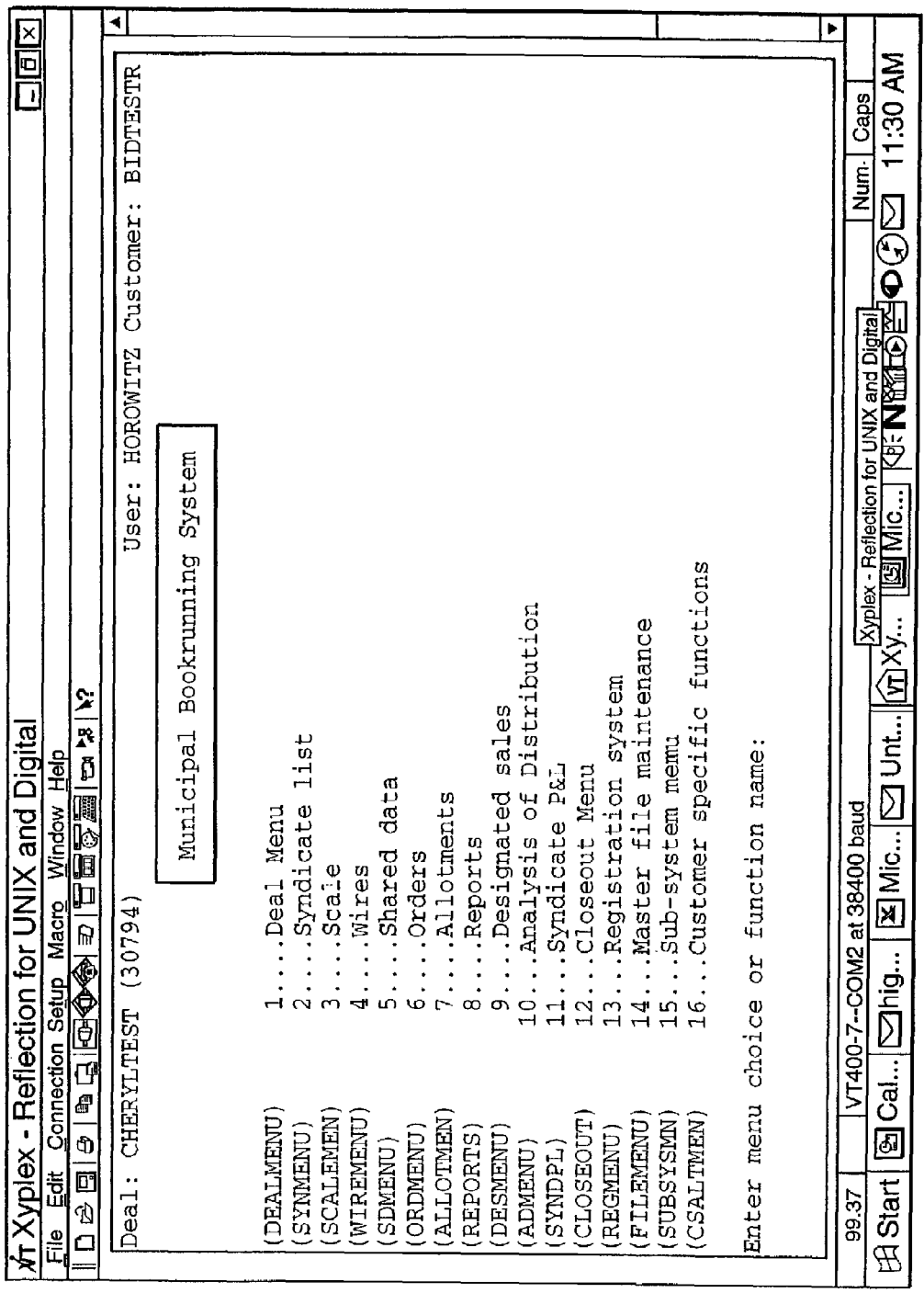
FIG. 3 illustrates the main menu of an exemplary bookrunning system.

FIG. 3 illustrates the main menu of an exemplary version of the bookrunning system. The senior manager system 118 typically accesses the bookrunning system over a communication channel using, for example, a username and password. Accordingly, the information available to the senior manager system 118 can be restricted based on the username and password. The bookrunning system can be optionally configured as a process controlled by one of the subsystems residing in the security syndicate transaction system 110 for seamless integration and exchange of data. The main menu includes a plurality of options designed to allow the senior manager system 118 to enter base information necessary for setting up the security syndicate offering. Selecting any of the menu options results in the display of a new screen which displays more detailed information, allows the senior manager system 118 to enter information, or provides further options. Typically, the senior manager system 118 would select the "deal menu" option in order to enter the base information for the security syndicate offering.

As illustrated in FIG. 4, the deal menu provides a central point from which the senior manager system 118 can enter information regarding the security syndicate offering. There are various fields and associated descriptors which identify the information to be entered. For example, one of the first fields and associated descriptor indicates the size of the security syndicate offering to be 1,000,000. There is also a description of the issuer system 114 providing the security syndicate offering. The senior manager system 118 can also indicate how revenues from the security syndicate offering will be used. The senior manager system 118 indicates whether the security syndicate offering includes, for example: multiple series, of bonds; whether the security syndicate is taxable, or subject to the alternative minimum tax (AMT) based on the tax structure of the issuer system 114, etc.

Depending on the specific computer platform being used by the senior manager system 118, data can be shared so that some of the information on the deal menu is automatically populated based on previously entered information. For example, if an issuer system 114 has entered information regarding the same security syndicate offering, all of that information would be carried over and used to automatically populate the appropriate fields on the deal menu. Similarly, information entered in the deal menu would be used to automatically populate appropriate fields on other menus.

The deal menu allows the senior manager system 118 to indicate if the security syndicate offering is negotiated or competitive, general obligation or revenue, book entry, status, registered, etc. Each field is intended to provide specific information regarding the security syndicate offering. For example, a competitive security syndicate offering can include multiple senior managers, while a negotiated security syndicate offering has a single senior manager. A general obligation security syndicate offering is backed by the taxing power of the issuing municipality, while a revenue security syndicate is backed by revenues generated, for example, from a toll road or bridge ultimately constructed from revenues raised by selling the security syndicates. The senior manager system 118 can also indicate if the security syndicate offering is bank qualified, the number of issues available, the senior manager in charge, the underwriter, etc.

Referring additionally to FIG. 5, the bookrunning system includes a "series menu" that allows entry of various dates regarding the security syndicate offering. The senior manager system 118 can indicate whether the security syndicate offering is for new funds, refunding, remarketing, and the amount. The dates input by the senior manager system 118 include an award date, first coupon date, initial trade date, delivery date, settlement date, dated date, etc. The senior manager system 118 can also include a coupon frequency to identify how often interest will be paid.

As illustrated in FIG. 5, the fields have been populated with information entered in the deal menu (FIG. 4). This is a direct result of the bookrunning system's ability to share and exchange data at various levels. The series menu also allows the senior manager system 118 to enter Moody and S&P ratings for the security syndicate offering. The senior manager system 118 can also indicate if the security syndicate offering is insured, the identity of the insurer, and bank providing a letter of credit (LOC). Depending on the particular security syndicate offering, multiple series may be available. In such cases, the senior manager system 118 would be presented with a listing (not shown) of the different series available. The senior manager system 118 would select one of the series from the listing, and the previously described series menu would be presented.

The next step in setting up the security syndicate offering is to identify the syndicate members 126. FIG. 6 illustrates a "syndicate list menu" that can be used to establish and view participation of syndicate members 126. The syndicate list menu allows the senior manager system 118 to enter the name of each syndicate member 126, as well as the syndicate member's participation level. The participation level typically refers to the level of financial liability the syndicate member 126 is willing to accept, although it may be based on other, or additional, factors. As illustrated in FIG. 6, the exemplary security syndicate offering includes four syndicate members 126, each with an equal level of participation totaling one billion dollars. The participation menu can prove beneficial in security syndicate offerings that include a large number of syndicate members.

Figure 7:
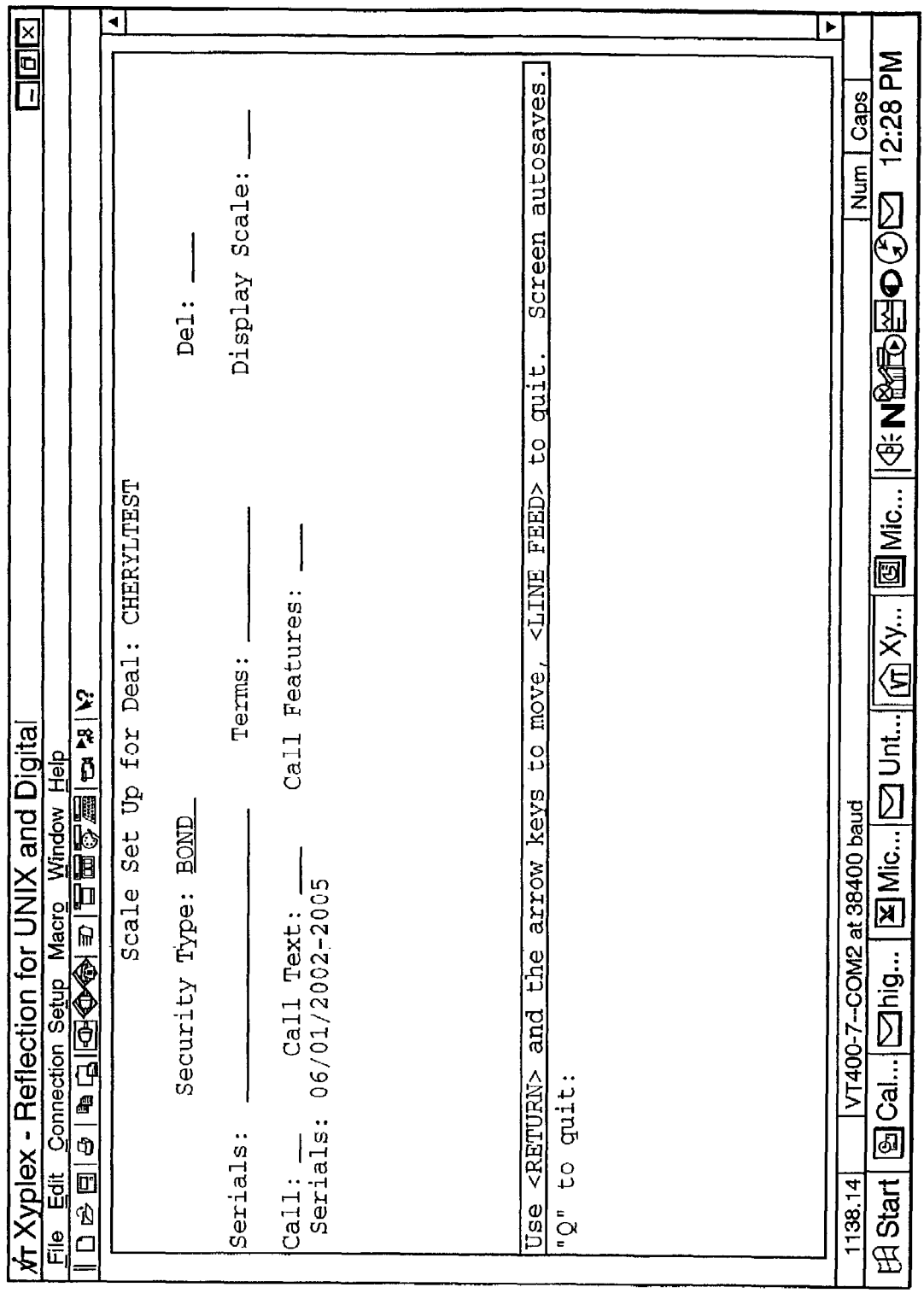
FIG. 7 illustrates a scale menu for setting the structure of the security syndicate.

FIG. 7 illustrates a "scale menu" that can be used to setup the structure of the security syndicate offering. Within each scale, it is possible to have one or more maturities. The scale menu allows the senior manager system 118 to enter various types of security syndicates including, but not limited to, regular bonds, zero coupon bonds, capital appreciation bonds, security notes, various types of derivative notes, etc. The senior manager system 118 can also enter serial and term maturities. A serial maturity has the same maturity date in succeeding years, while term maturities have a long period between maturities. The senior manager system 118 can also indicate whether the issuer system 114 can call the securities prior to maturity, as well as the specific call features.

The next step in setting up the security syndicate offering is to establish a pricing wire. FIG. 8 illustrates a "wire menu" usable by the senior manager system 118 to establish the pricing wire. The wire menu presents a plurality of fields to the senior manager system 118. Each field gives the senior manager system 118 an option to allow syndicate members 126 access to the information described. For example, as illustrated in FIG. 8, the senior manager system 118 will allow syndicate members 126 to view MSRB messages, the approximate size of the deal, the principle amounts, and the approximate cost per yield price by entering "yes" in the corresponding fields. If the senior manager system 118 has entered "no" in the remaining fields (as in FIG. 8), syndicate members 126 are prevented from viewing the contents of those fields.

FIG. 9 illustrates an "order menu" that allows the issuer system 114 to control the information available to syndicate members 126 during the order period. The order menu allows the senior manager system 118 to indicate whether an order monitor will be available for use by syndicate members 126, and identifies the role of syndicate members 126 who access the order monitor. The senior manager system 118 can indicate whether the issuer system 114 (and syndicate members 126) will be allowed to see the actual quantity of securities that have been sold. The senior manager system 118 can also indicate when the order period for the security syndicate will begin and end, as well as the type of orders that will be accepted.

At this point, the security syndicate has been set up and various transactions will be taking place. For example, syndicate members 126 will actively solicit the sale of securities to institutional clients such as financial institutions. At the same time, the senior manager system 118 will be responsible for controlling allotment and sale of the securities. The senior manager system 118 will also be responsible for transmitting various messages regarding the security syndicate offering to syndicate members 126. As previously stated, the issuer system 114 has an interest in viewing transactions during the security syndicate offering in order to assess the progress of sales.

According to the disclosed embodiment of the invention, the issuer system 114 advantageously accesses the transaction monitoring system 100 (e.g., the issuer monitor) using conventional communication networks such as, for example, the Internet or a direct-connection network. Preferably, the transaction monitoring system 100 is accessed using a computer, or appropriate terminal device, with an operating system that includes a graphical interface. Further, the graphical interface may support a variety of applications programmed using HTML, XML, JAVA, or other standard programming languages. Accordingly, various features of the transaction monitoring system 100 (e.g., the issuer monitor) would be accessible by navigating through one or more menus using a conventional input device such as a keyboard or mouse.

Figure 10:
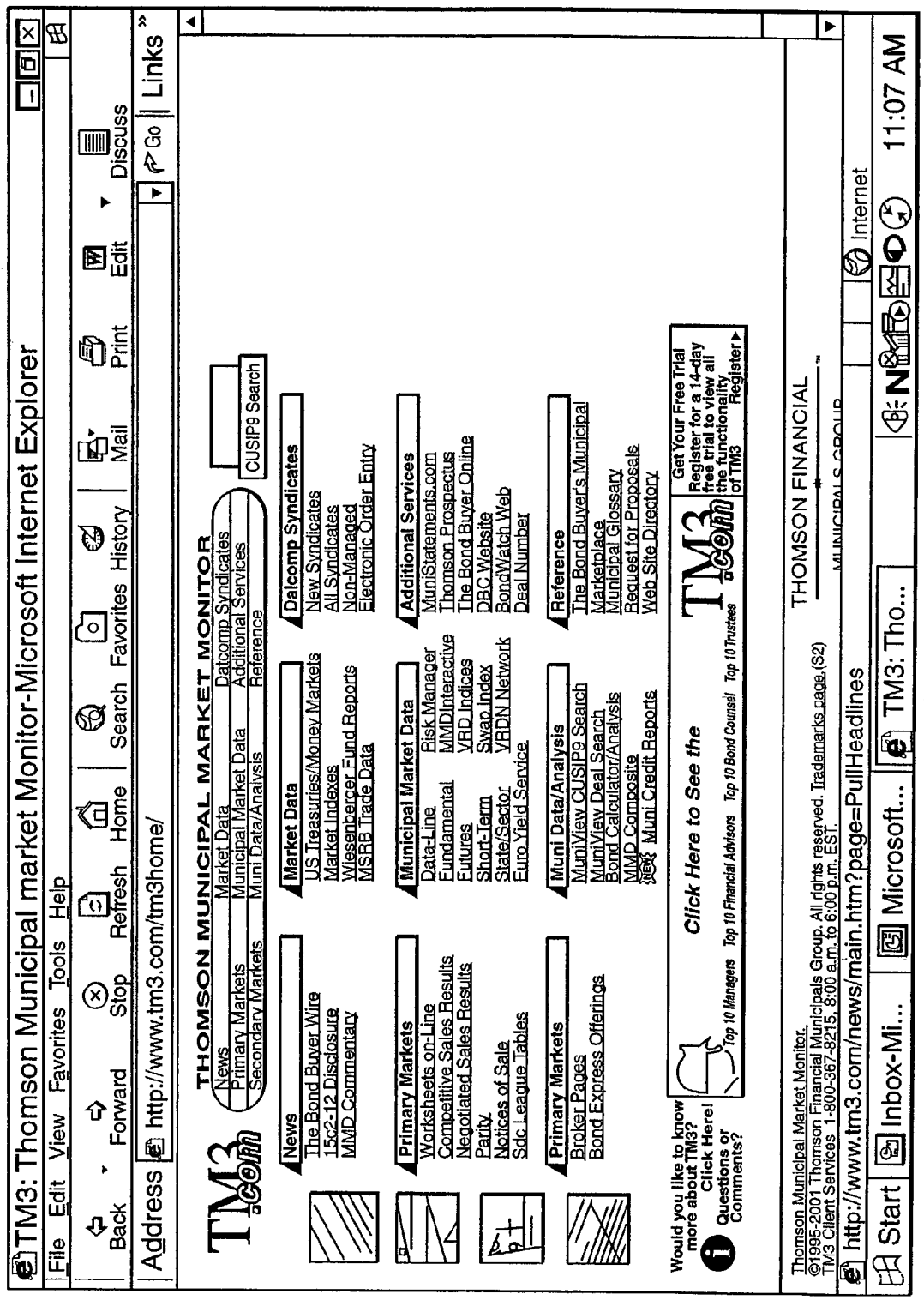
FIG. 10 illustrates the main menu of an exemplary front end system through which the present transaction monitoring system can be accessed.

FIG. 10 illustrates the main menu of a municipal market monitor through which the transaction monitoring system 100 can be accessed. The municipal market monitor is essentially a portal that allows users to access various application systems via a graphical front end. The municipal market monitor is accessed through a communication network as previously described. The issuer system 114 would typically select the "electronic order entry" hyperlink in order to access the transaction monitoring system 100. The issuer system 114 would then be prompted to input an appropriate username and password. The municipal market monitor would verify the information entered by the issuer system 114 and establish the appropriate access rights. The access rights can be used, in part, to control the type and amount of information accessible by the issuer system 114.

Figure 11:
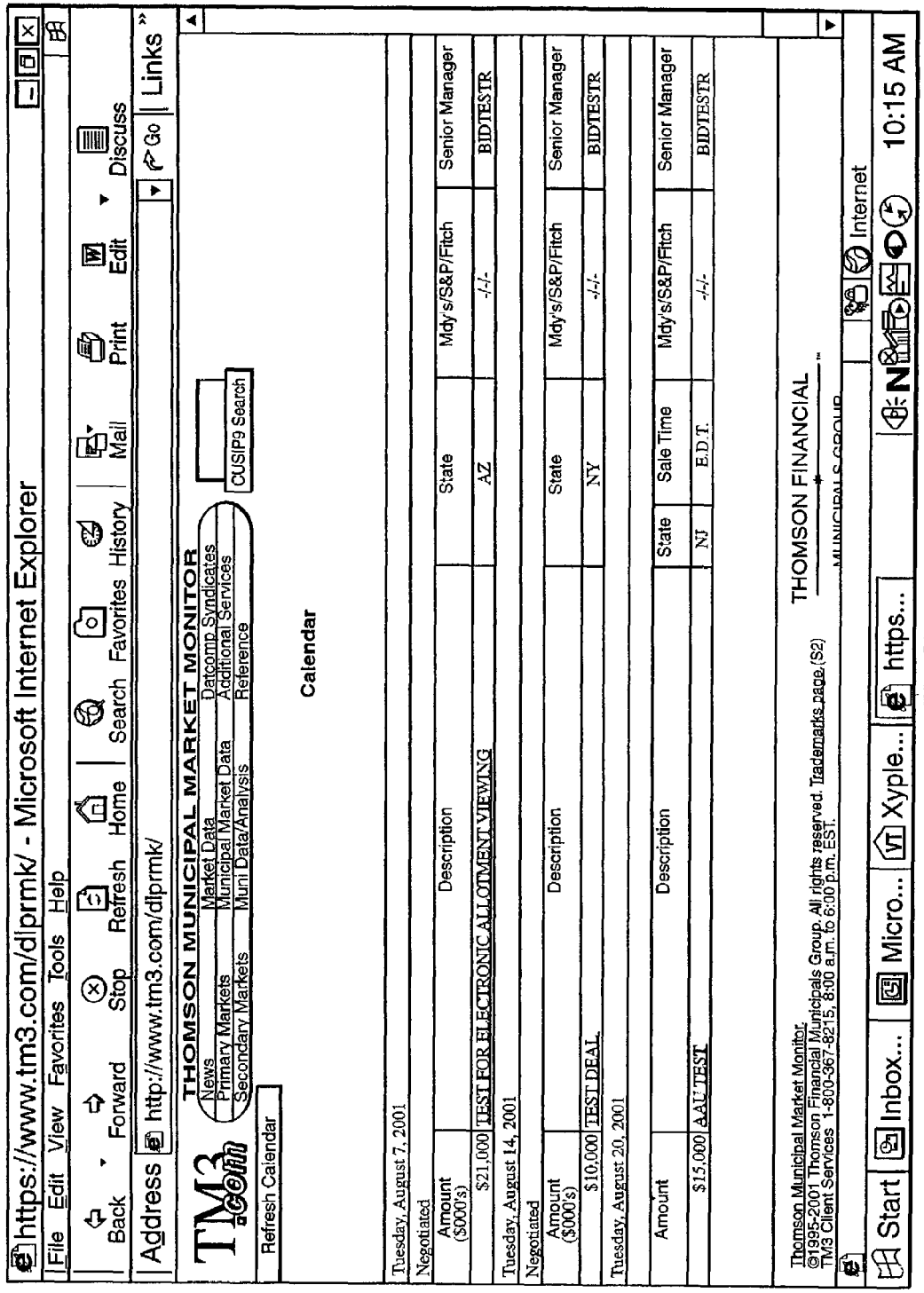
FIG. 11 illustrates a calendar menu listing current security syndicate offerings.

FIG. 11 illustrates a "calendar menu" that is displayed once the issuer system 114 has successfully logged into the municipal market monitor. The calendar menu is specifically tailored for the issuer system 114 and displays all of the issuer's available (active and inactive) security syndicate offerings. As shown in FIG. 11, the issuer system 114 currently has three security syndicate offerings available. The calendar menu includes a number of fields that provide information to the issuer system 114. Each field can optionally have a descriptor associated therewith to describe the content of the field. The calendar menu includes similar fields for each security syndicate. For example, there is a date field which identifies the closing date for the security syndicate offering, and syndicate type field which identifies the type of security syndicate offering (e.g., negotiated or competitive). The calendar menu also includes various descriptors and associated fields containing information pertaining to, for example, amount, description, state, rating, senior manager, etc. for the security syndicate offering.

As previously discussed, data can be shared across multiple platforms (e.g., menu levels and/or application systems) for a given security syndicate offering. Accordingly, it is not necessary for the issuer system 114 to input any information. Rather, the fields can be automatically populated based on current data. The amount field displays the monetary value of the security syndicate offering, and the description field displays a predetermined description, or name, for the security syndicate offering. Typically, the security syndicate offering is given a name representative of the ultimate use for funds raised. The state field displays the state having jurisdiction over the municipality issuing the security syndicate offering, while the rating field displays the appropriate Moody's, S&P, and Fitch ratings. The senior manager field identifies the senior manager system 118 in charge of the security syndicate offering. As illustrated in FIG. 11, the content of the description field is in the form of a hypertext link. The issuer system 114 can thus obtain more detailed information regarding a particular security syndicate offering by selecting the appropriate hypertext link.

Figure 12:
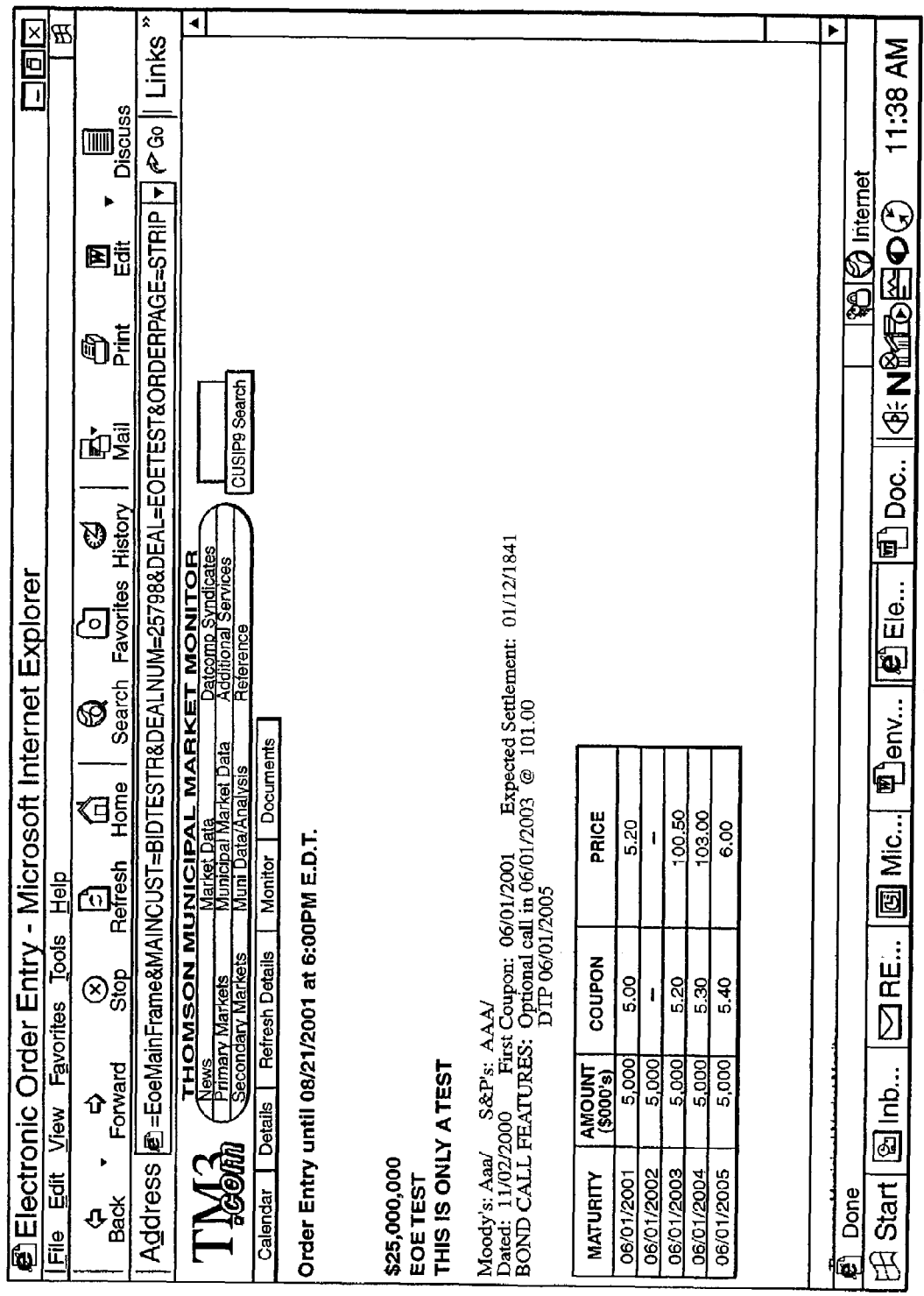
FIG. 12 illustrates a detailed security syndicate menu listing the various maturities in the security syndicate offering.

FIG. 12 illustrates a "detailed security syndicate menu" which results from such an action. More particularly, the issuer system 114 has elected to view more detailed information regarding the "EOE test" security syndicate offering. The detailed security syndicate menu displays the scale for the selected security syndicate offering in the form of a table containing each maturity date in the scale. The table also displays the monetary value, coupon, and price for each maturity. In addition, the issuer system 114 is provided with information such as the dated date, first coupon date, expected settlement date, etc. Bond call features, such as the call in date and price, are also displayed. As shown in FIG. 12, the detailed security syndicate menu also includes a plurality of selection buttons that allow the issuer system 114 to quickly access various information. For example, the issuer system 114 can access the calendar menu or update the current menu by selecting either the "calendar" button or the "refresh details" button, respectively. The issuer system 114 can also view documents related to the selected security syndicate offering by pressing the "documents" button.

The issuer system 114 can also select the "monitor" button to view transactions (either delayed or in real time) taking place for the selected security syndicate offering. FIG. 13 illustrates a "monitor" menu which is displayed in response to the issuer system 114 selecting the "monitor" button. The monitor menu displays detailed transaction information regarding each maturity in the security syndicate offering. According to the exemplary embodiment of the invention illustrated in FIG. 13, the information is displayed in a table format with the various maturities occupying different rows in the first column. The next two columns display the coupon rate and monetary value of each maturity. The last row of the table provides a monetary value which represents a summation of all the maturities (e.g., the total value of the security syndicate offering).

The next three columns display information regarding the orders received. The information is classified as either priority orders, member orders, or total orders for each maturity. The priority orders correspond to retail orders and are typically filled before orders received from financial institutions and investors. These three columns also include a summation row which provides total values of the different maturities for the entire security syndicate offering. The final column of the table displays the balance for each maturity as well as the entire security syndicate offering. A positive value indicates the outstanding value, while a negative value indicates the extent to which each maturity (and possibly the security syndicate) has been over-committed. The issuer system 114 can update the information displayed in the monitor menu by simply selecting the "refresh monitor" button. Alternatively, the transaction monitoring system 100 can be configured to automatically update the information, for example, each time a new transaction is recorded. As illustrated in FIG. 13, each maturity date is presented in the form of a hypertext link. Accordingly, the issuer system 114 could select any desired maturity to obtain additional information.

FIG. 14 illustrates a "maturity detail" menu that displays information regarding orders placed for each maturity. The maturity detail menu displays all the buyers who have placed an order for the selected maturity. The maturity level also displays the order type, amount, and date/time each order was received. The order type identifies the order as a member order or priority order, and the amount corresponds to the monetary value of the order. The maturity detail menu also displays whether an order is retail or not. As illustrated in FIG. 14, each order is displayed on a separate row. More particularly, the details of an order are presented chronologically. The maturity detail menu also includes a "refresh monitor" button which allows the issuer system 114 to update information pertaining to the selected maturity. Similar to the monitor menu, the refresh function (and most of the manual update-type functions) can be automatically performed by the transaction monitoring system 100.

Figure 15:
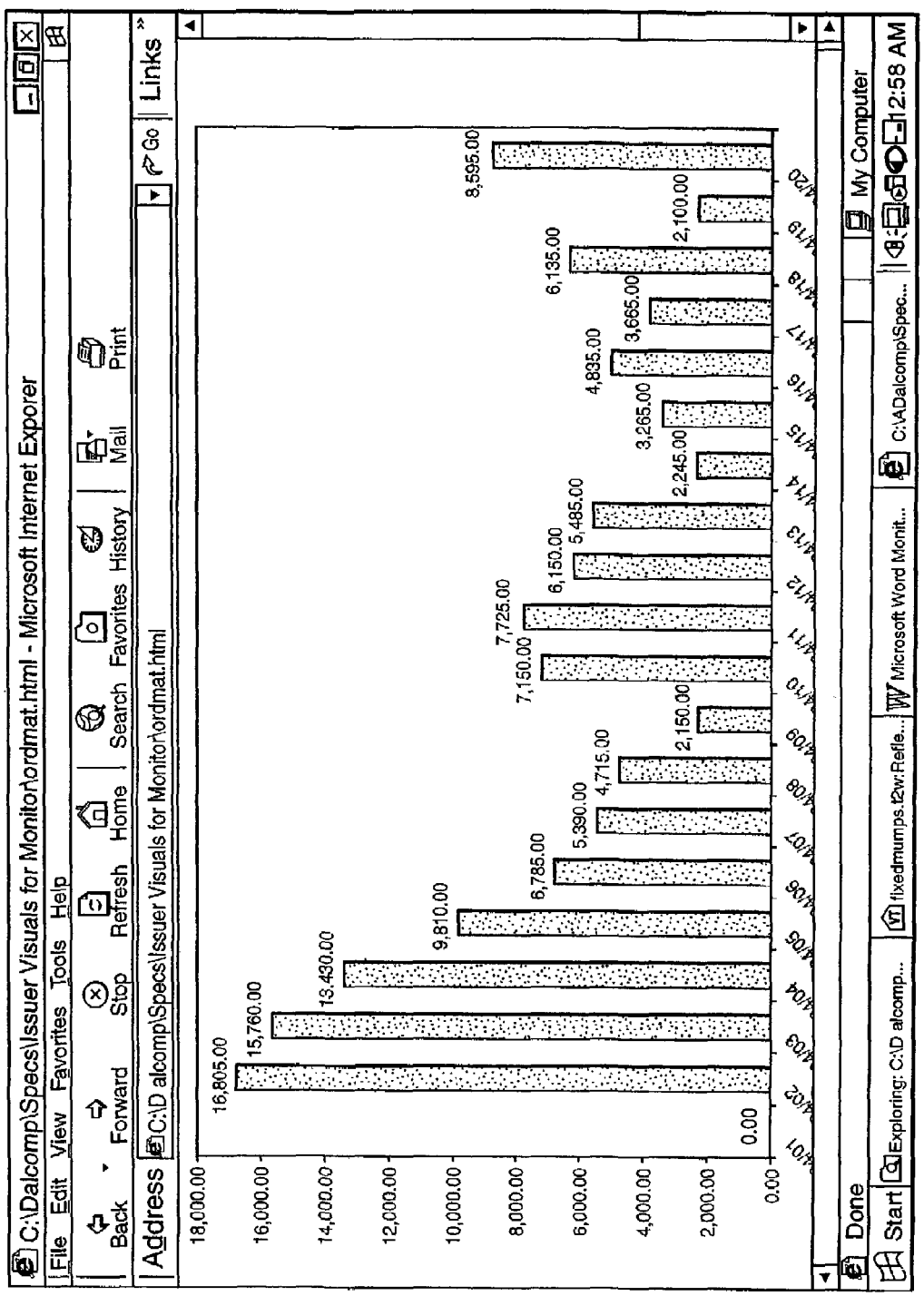
FIG. 15 is a bar graph generated to display the number of orders based on maturity.
Figure 16:
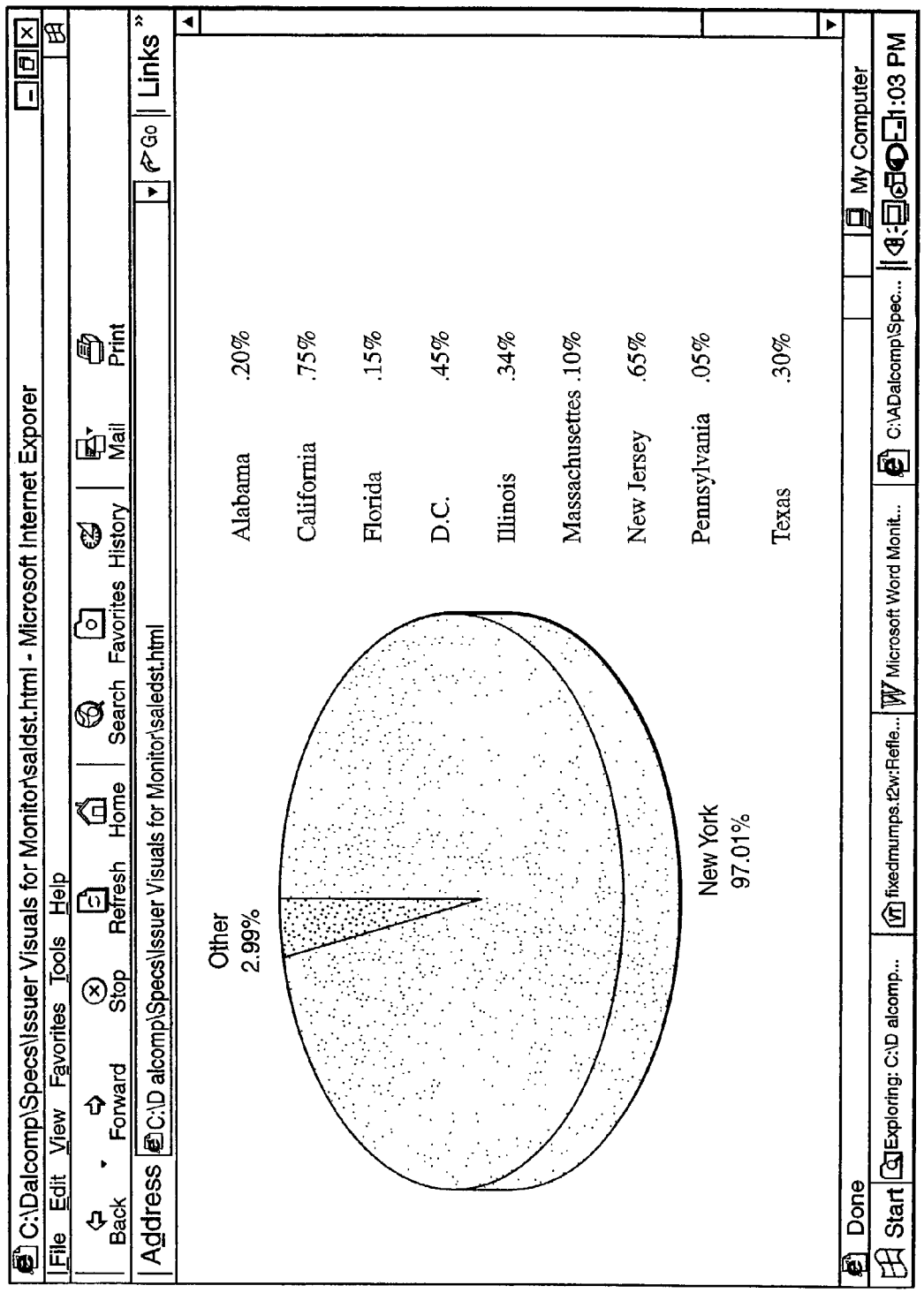
FIG. 16 is a pie graph generated to illustrate the geographic distribution of orders for a security syndicate offering.
Figure 17:
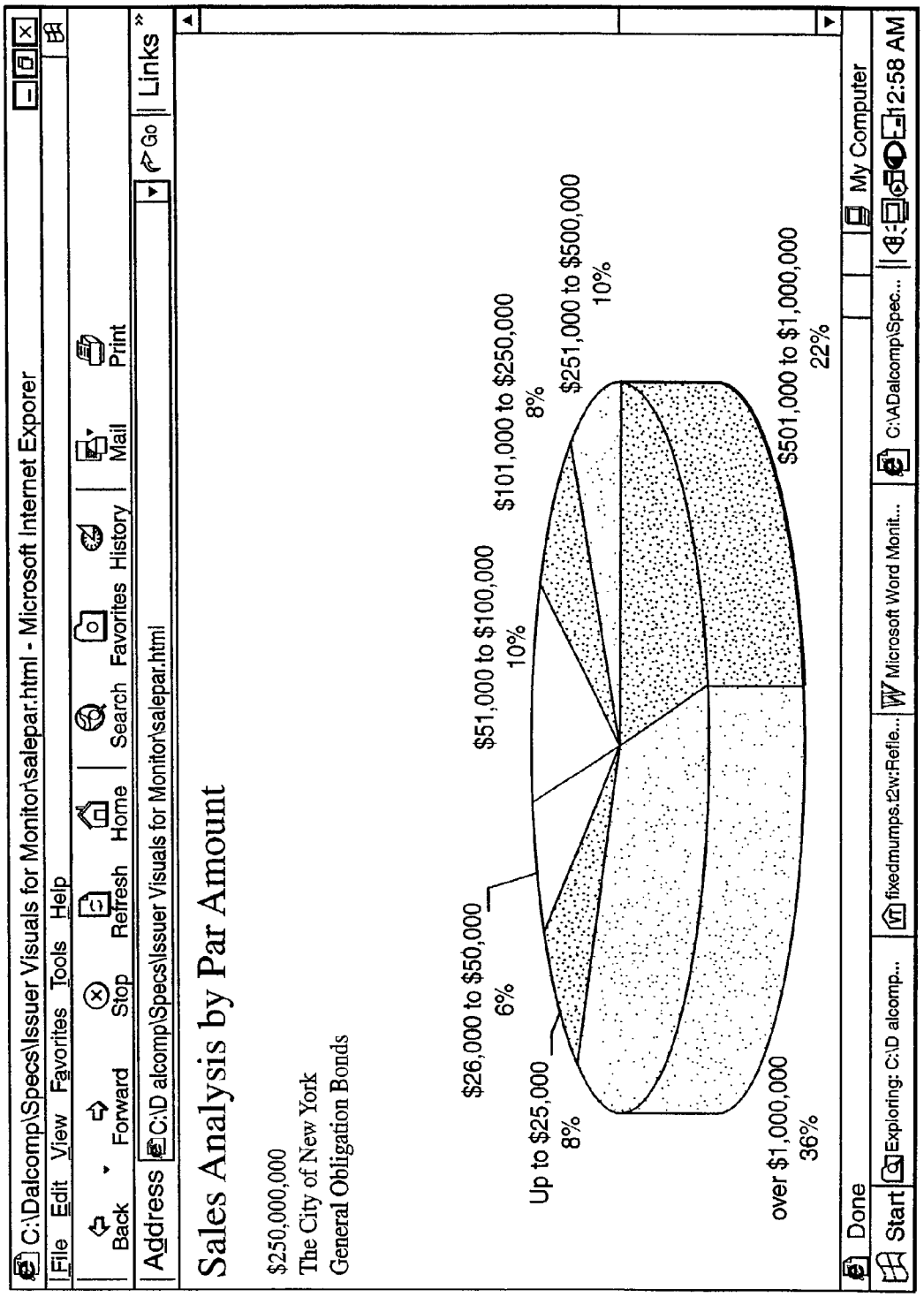
FIG. 17 is a pie graph illustrating the sales analysis for the security syndicate offering by par amount.
Figure 18:
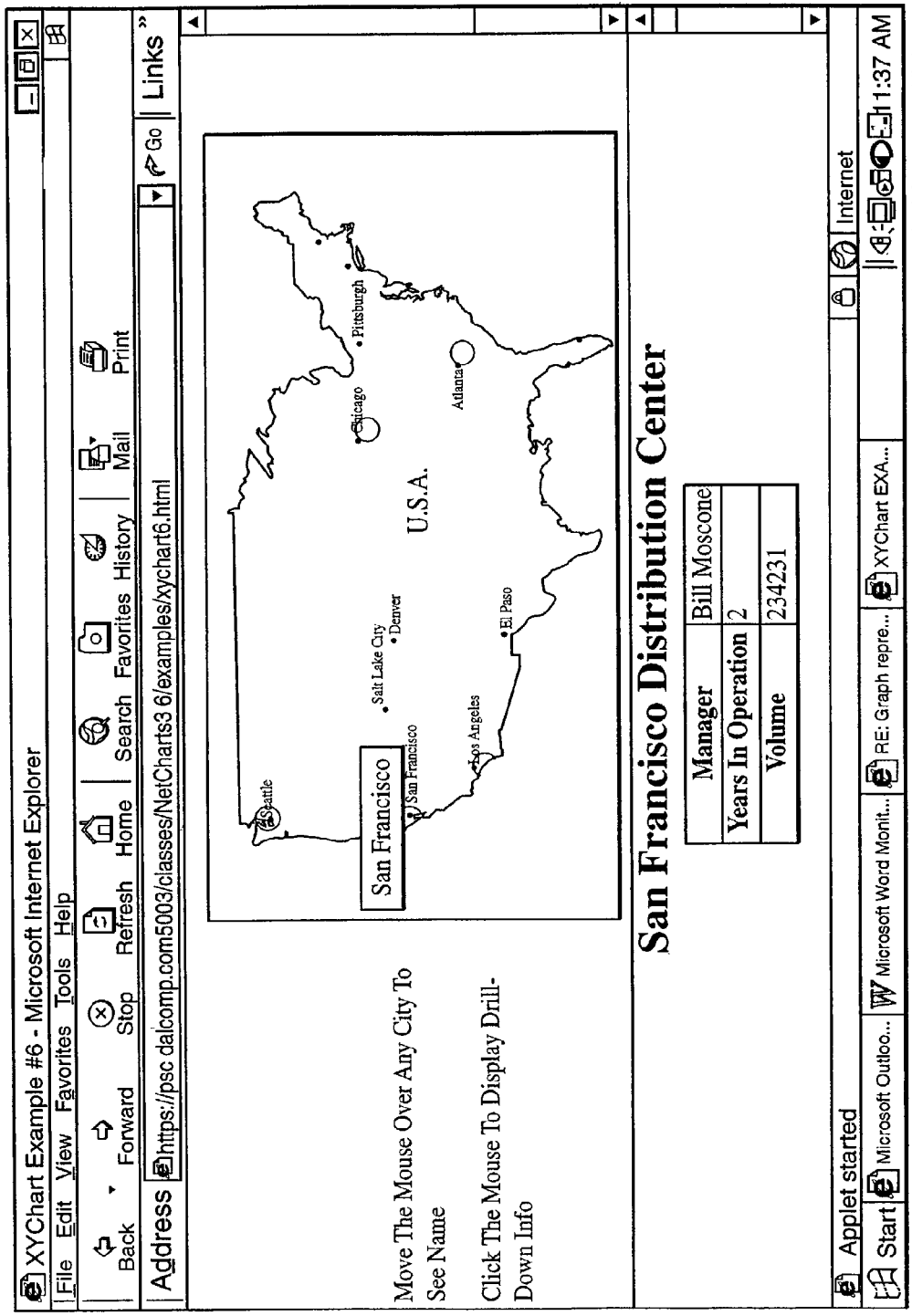
FIG. 18 is a map illustrating the geographic distribution of orders received.

As previously indicated, the disclosed embodiment of the invention can correlate information and generate reports for the issuer system 114, and optionally for other syndicate members. FIGS. 15-18 illustrate examples of such reports. Referring first to FIG. 15, the issuer system 114 can elect to view a bar graph which displays the number of orders received with respect to each maturity. FIG. 16 advantageously displays a sales analysis of the geographic distribution of orders for a security syndicate offering. According to FIG. 16, the majority of orders have been received from New York. However, there are several other states that placed orders. The names of the remaining states have been disclosed alongside the graph in order to minimize clutter. FIG. 17 advantageously displays a sales analysis for the security syndicate offering by par amount. FIG. 18 advantageously displays a geographic illustration of orders received. A national (or regional in certain instances) map is provided with the names of cities, from which orders have been received, displayed as hypertext links. The issuer system 114 can then select a particular city and receive information regarding, for example, orders received, branch manager, years in operation, etc.

While the foregoing exemplary reports have been based on orders received, it should be noted that the data can easily be modified to reflect other factors such as, for example, actual sales. Furthermore, different types of graphs can be generated. According to optional features of the invention, the reports (or graphs) can be updated, either manually or automatically, to reflect the current status of orders, sales, etc. for the security syndicate offering.

Hardware Description

Figure 19:
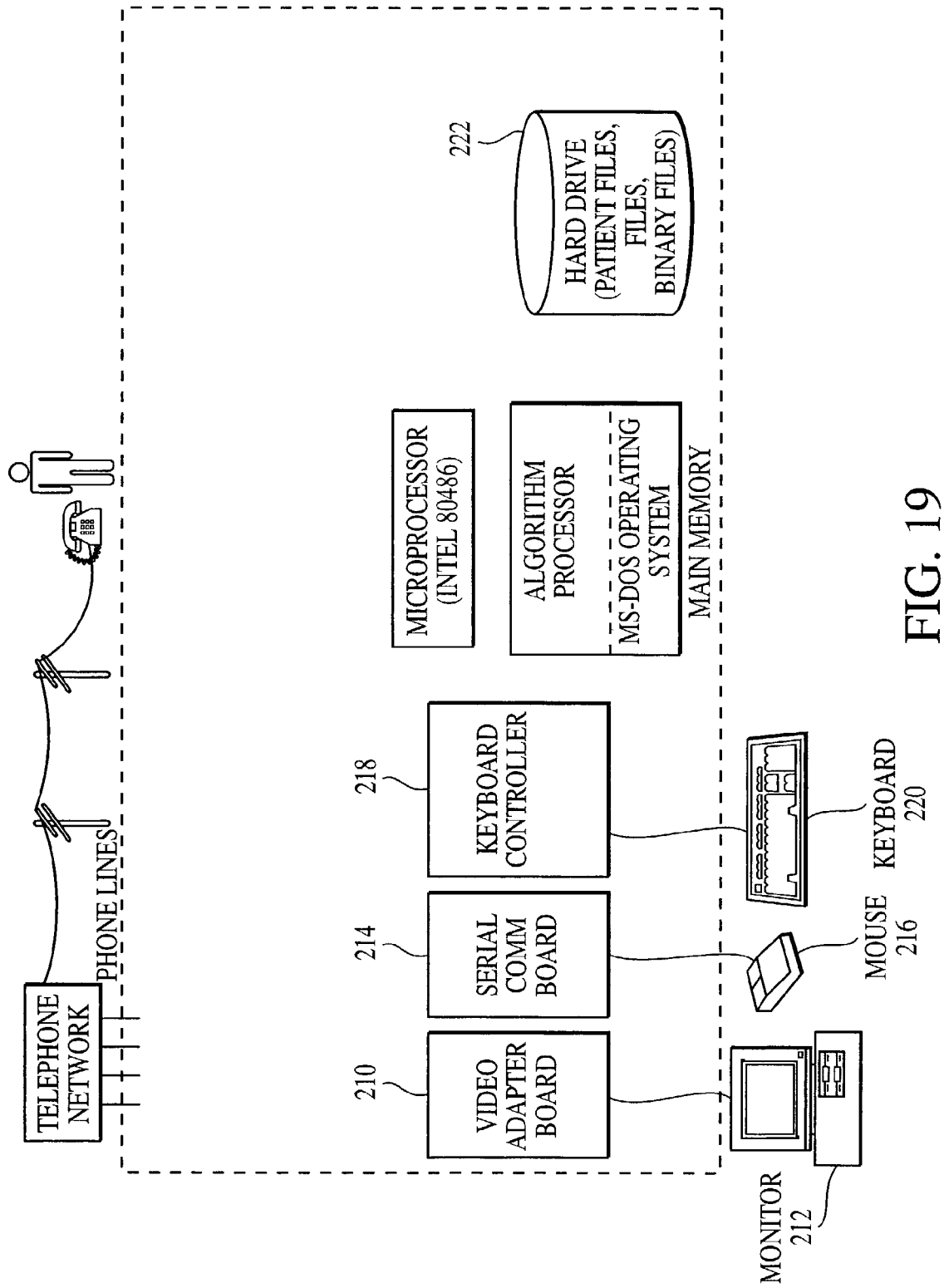
FIG. 19 is an illustration of the computer system and telephone network used in several embodiments of the invention.
Figure 20:
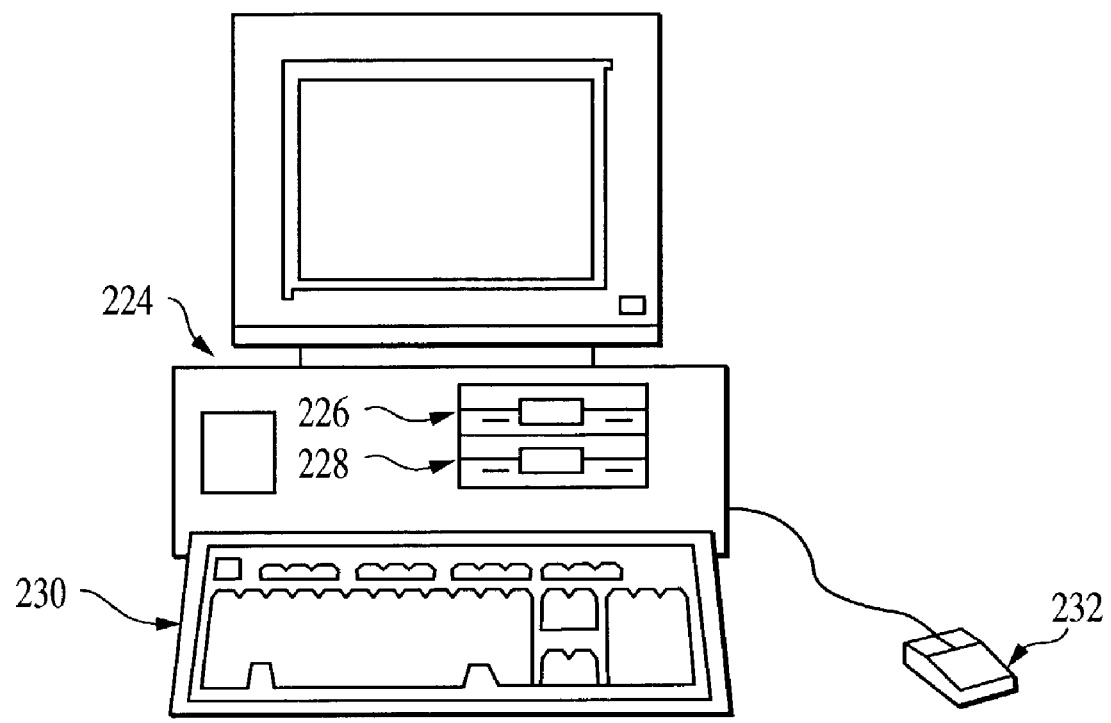
FIG. 20 is an illustration of another computer of the type suitable for use in the invention.
Figure 21:
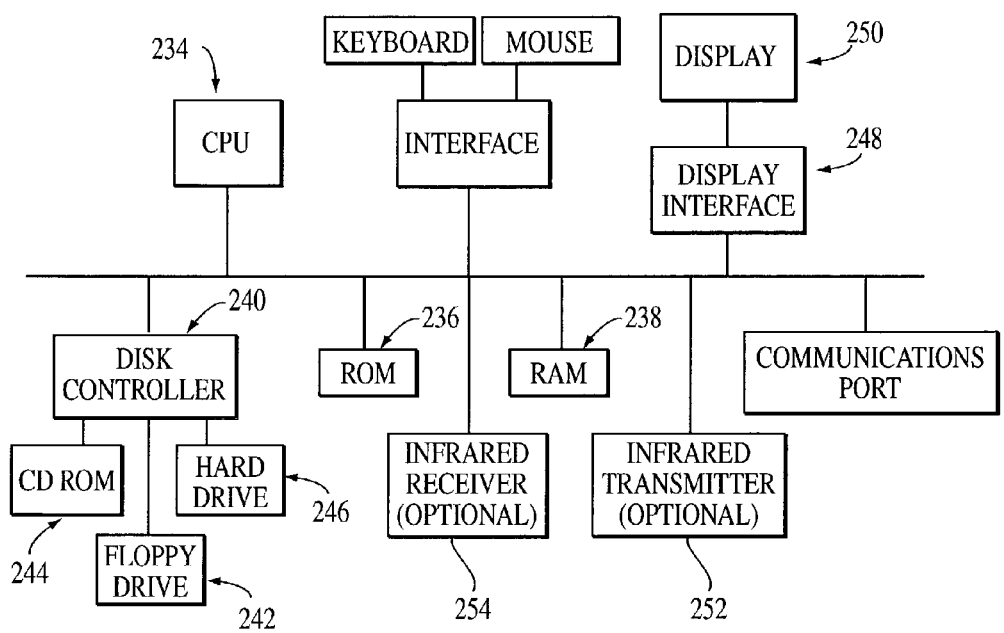
FIG. 21 is a block diagram of standard computer components that make up a standard computer and that may be used in the invention.
Figure 22:
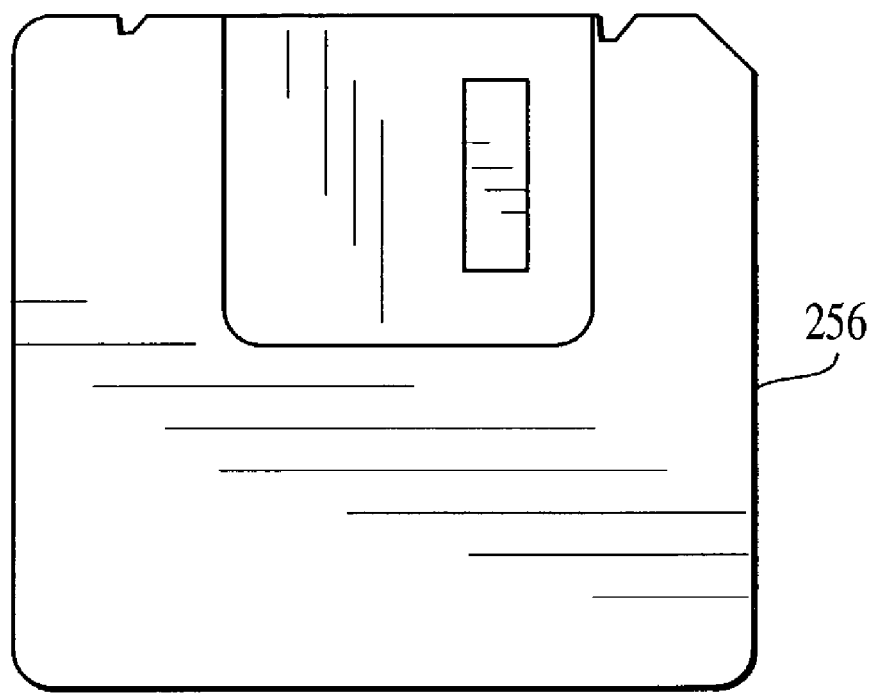
FIG. 22 is a conceptual view of the memory storage medium.
Figure 23:
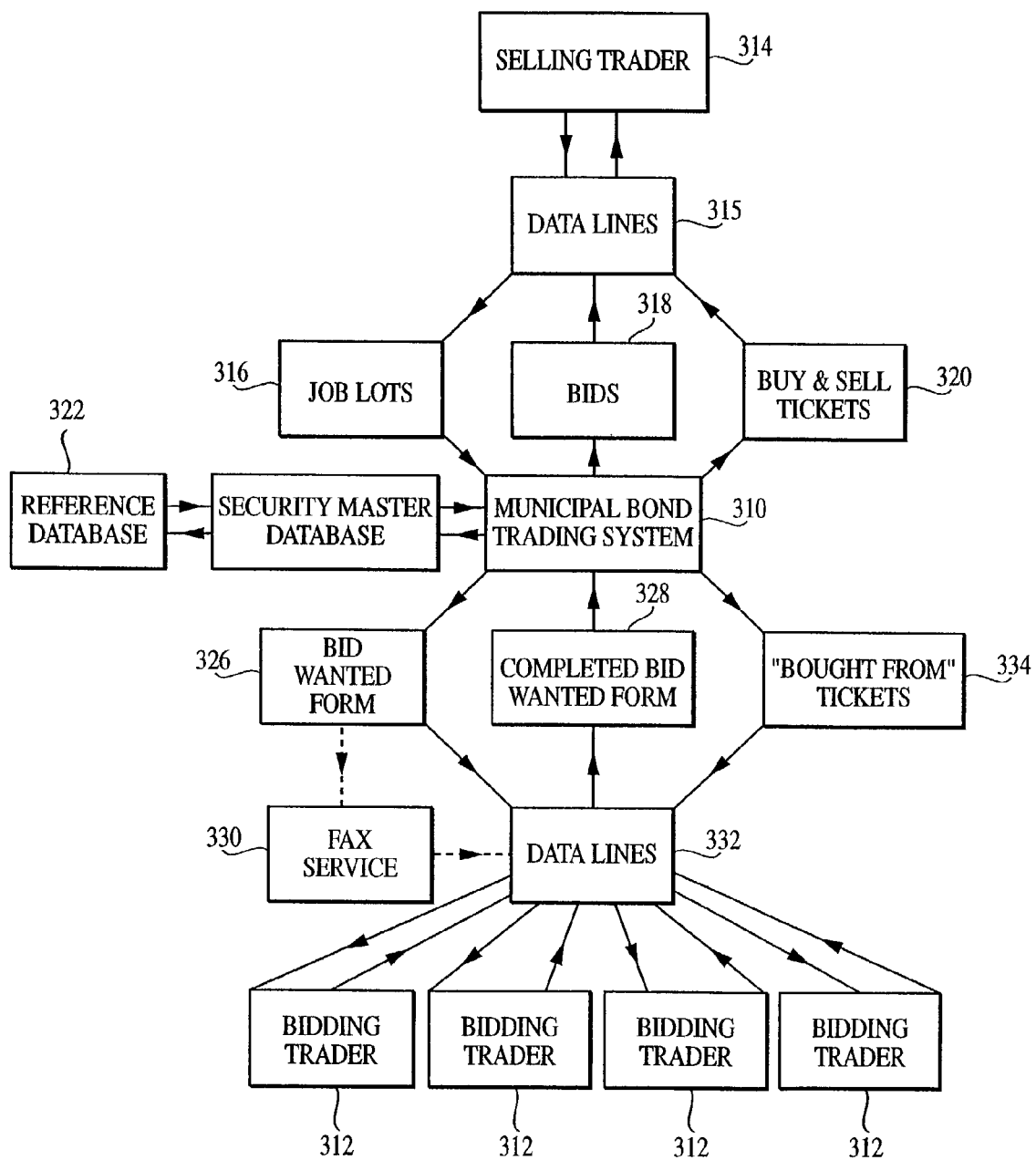
FIG. 23 is a prior art block diagram illustrating data flow between a bond selling trader and multiple buying traders linked via a municipal bond trading system.
Figure 24:
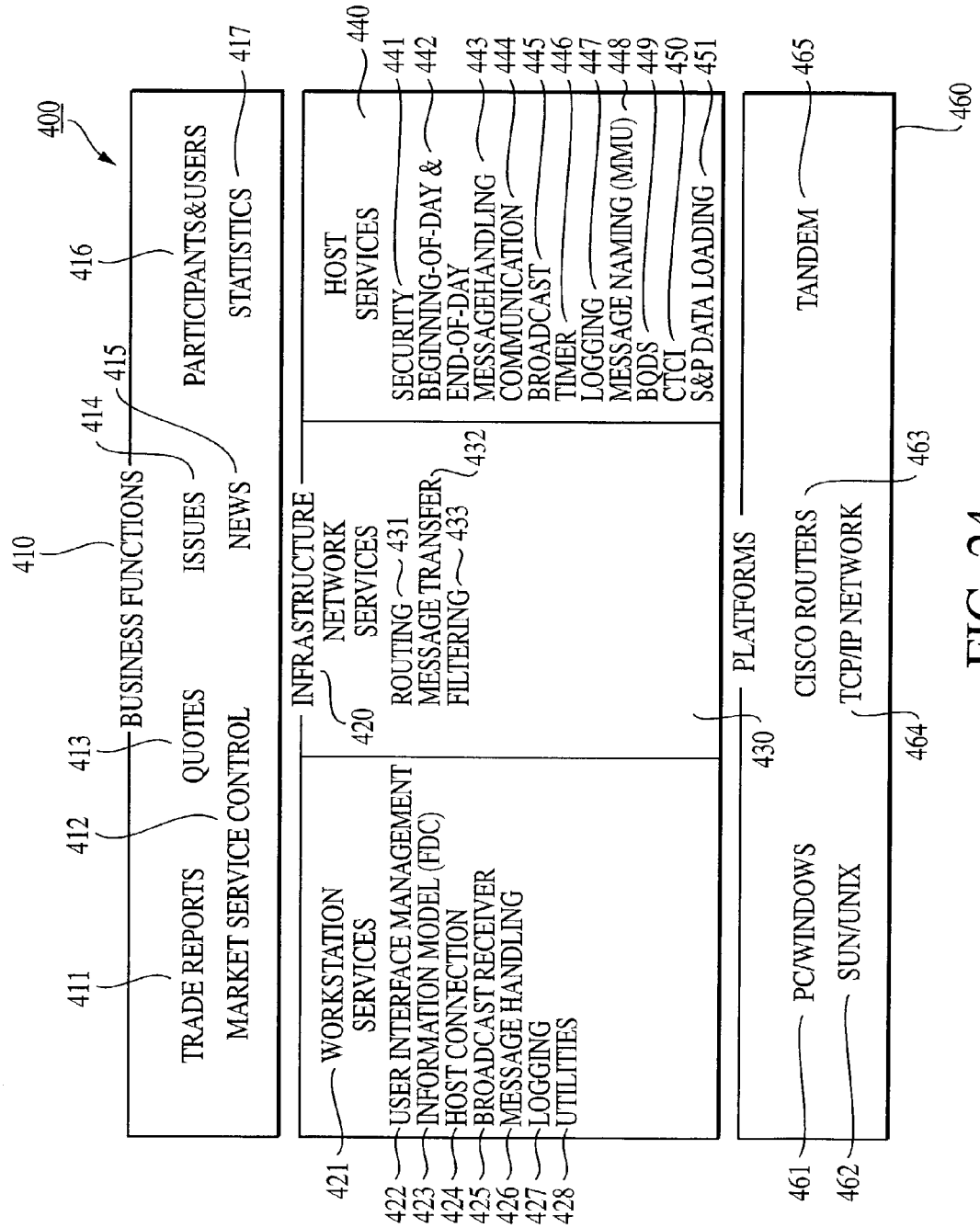
FIG. 24 is a prior art block diagram of the functional architecture for a fixed income pricing system.

FIG. 19 is an illustration of the computer system and telephone network used in several embodiments of the invention. FIG. 20 is an illustration of another computer of the type suitable for use in the invention. FIG. 21 is a block diagram of standard computer components that make up a standard computer and that may be used in the invention. FIG. 22 is a conceptual view of the memory storage medium.

Hardware Configurations

FIG. 19 is a block diagram of the hardware design of a computer of the type that can be used in the invention. A video adapter board 210, preferably at VGA or better resolution, interconnects to a video monitor 212. A serial communication circuit 214 interfaces a pointing device, such as a mouse 216. A parallel communication circuit may be used in place of circuit 214 in another embodiment. A keyboard controller circuit 218 interfaces a keyboard 220. A small computer systems interface (SCSI) adapter provides a SCSI bus to which, for example, a 100 Gb or greater hard disk drive is attached. The hard drive 222 stores database files such as the patient files, drug utilization files, and demographic files.

FIG. 20 illustrates another personal computer of the type suitable for carrying out the invention. Viewed externally, the conceptual computer system in FIG. 20 has a central processing unit 224 having disk drives. Disk drive indications 226, 228 are merely symbolic of a number of disk drives which might be accommodated by the computer system. Typically these would include a floppy disk drive 226, a hard disk drive (not shown externally), and a CD ROM. The number and type of drives varies, typically with different computer configurations. Disk drives are in fact optional, and for space considerations, may easily be omitted from the computer system used in conjunction with the processes described herein.

The computer also has an optional display upon which information is displayed. In some situations, a keyboard 230 and a mouse 232 may be provided as input devices to interface with the central processing unit. Then again, for enhanced portability, the keyboard may be either a limited function keyboard or omitted in its entirety. In addition, mouse may be a touch pad control device, or a track ball device, or even omitted in its entirety as well. In addition, the computer system also optionally includes at least one infrared transmitter and/or infrared receiver for either transmitting and/or receiving infrared signals, one example of wireless transmission and/or reception.

FIG. 21 illustrates a block diagram of the internal hardware of the computer of FIG. 20. A bus serves as the main information highway interconnecting the other components of the computer. CPU 234 is the central processing unit of the system, performing calculations and logic operations required to execute a program. Read only memory (ROM) 236 and random access memory (RAM) 238 constitute the main memory of the computer. Disk controller 240 interfaces one or more disk drives to the system bus. These disk drives may be floppy disk drives 242 or CD ROM 244 or DVD (digital video disks) drives such as, internal or external hard drives 246. As indicated previously, these various disk drives and disk controllers are optional devices.

A display interface 248 interfaces the display 250 and permits information from the bus to be displayed on the display 250. Again as indicated, the display is also an optional accessory. For example, the display could be substituted or omitted from the device, and a display on the telephone may be used to display information. Communication with external devices occurs utilizing, for example, the communication port or standard wireless devices.

In addition to the standard components of the computer, the computer also optionally includes an infrared transmitter 252 and/or infrared receiver 254. Infrared transmitter is utilized when the computer system is used in the process described herein. Infrared receiver is generally utilized when the computer system is used in conjunction with the telephone that is to receive the infrared signal. Instead of utilizing an infrared transmitter or infrared receiver, the computer system could use at least one of a low power radio transmitter and/or a low power radio receiver. The low power radio transmitter transmits the signal for reception by another low power radio receiver. The low power radio transmitter and/or receiver are standard devices in industry.

Additionally, the computer system can be provided with an optional security layer (not shown) to prevent unauthorized access data and hardware. Security layers may also be included in the communication between the senior manager and syndicate members or between the issuer and security syndicate transaction system to protect privacy or for other reasons (e.g., preventing theft or fraud). The security layer includes any standard security scheme or technology, such as standard decryption technology, and may be used system wide as well, for example, with all workstations, senior managers, issuers, syndicate members, and the like. As described above, the present invention does not require the direct interaction with the various computers, but provides this additional feature to further facilitate the communication process between various work station personnel, and the like.

FIG. 22 is an illustration of an exemplary memory medium 256 which can be used with disk drives illustrated in FIGS. 20 and 21. Typically, memory media such as floppy disks, a CD ROM, or a digital video disk will contain, for example, a multi-byte locale for a single byte language and the program information for controlling the computer to enable the computer to perform the functions described herein. Alternatively, ROM 236 and/or RAM 238 illustrated in FIG. 21 can also be used to store the program information that is used to instruct the central processing unit to perform the operations associated with the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of monitoring the flow of transactions during a security syndicate offering, comprising the steps:

receiving by a security syndicate transaction system, a request to access from an issuer using an issuer computer, an active security syndicated offering managed by the security syndicate transaction system via a communication network, said security syndicate transaction system including a data storage device storing at least one of the active security syndicated offering and information regarding a plurality of orders from a plurality of buyers, said order information associated with the at least one active security syndicated offering, where said active security syndicated offering is at least one bond;

transmitting by the security syndicate transaction system for display by the issuer computer one or more active security syndicate offerings to the issuer, each of the one or more active security syndicate offerings having a predetermined value;

transmitting by the security syndicate transaction system for display by the issuer computer information associated with the selected security syndicate offering to the issuer using a security syndicate transaction server associated with the security syndicate transaction system, the information including at least a maturity date for the bond, a monetary amount for the maturity date, a coupon value, and at least one of a unit price per bond and an interest yield;

processing by the security syndicate transaction system order information associated with the selected security syndicate offering based on at least a plurality of orders from the plurality of buyers, the order information processed with respect to at least one of a time which the at least one order is placed for the security syndicate offering, a size of the at least one order placed for the security syndicate offering, and at least one of an identity and characteristic of the plurality of buyers of the plurality of orders placed for the security syndicate offering;

generating at least one report by the security syndicate transaction system for the selected security syndicate offering based on the processed information, the at least report including the at least one of the time which the plurality of orders is placed for the security syndicate offering, the size of the order placed for the security syndicate offering, and at least one of the identity of the plurality of buyers, characteristic of the plurality of buyers, and a geographic distribution of the plurality of orders placed for the security syndicate offering;

determining by the security syndicate transaction system, a total number of orders received, a rate at which orders are being received, and determining one or more trends of the plurality of orders based on the at least one change in the relative size of orders being received and a change in the rate of orders being received;

transmitting to the issuer computer the at least one generated report for the selected security syndicate offering for display by the issuer computer, the at least one report including report information comprising the total number of orders received, the rate at which the orders are being received, and the one or more trends;

determining whether to adjust the selected security syndicate offering based on the one or more trends responsive to said generating and said transmitting the at least one report for the selected security syndicate offering;

receiving a request by the security syndicate transaction system to adjust the selected security syndicate offering when it is determined to adjust the selected security syndicate offering, based on the one or more trends; and inputting the request to and adjusting the selected security syndicate offering by the security syndicate transaction system when the request is received to adjust the selected security syndicate offering by the security syndicate transaction system.

2. The method of claim 1, wherein the geographic distribution of the plurality of orders placed for the security syndicate offering further includes the geographic origin of each of the plurality of orders.

3. The method of claim 1, wherein:
the change in the rate of orders being received is negative; and
the step of determining whether to adjust the selected security syndicate offering based on the one or more trends includes adjusting at least the interest yield associated with the bond.

4. The method of claim 1, further comprising the step of determining an expiration time and whether the expiration time has been reached for the security syndicate, thereby if the expiration time has not been reached updating the security syndicate offering.

5. The method of claim 1, further comprising receiving information available to a senior manager without contacting the senior manager.

6. The method of claim 1, further comprising:
receiving first information from and transmitting second information to a senior manager computer; and
transmitting third information to said issuer computer comprising at least one message regarding said one or more trends.

7. The method of claim 6, further comprising receiving an adjustment from said senior manager computer to adjust at least one value affecting the one or more trends.

8. The method of claim 1, wherein the information associated with the selected security syndicate offering further comprises bond rating information, wherein the bond rating information is updated by the security syndicate transaction system in response to ratings provided by one or more rating agencies.

9. The method of claim 1, wherein transmitting to the issuer computer the at least one generated report for the selected syndicate offering for display by the issuer computer comprises providing one or more menus for display on the issuer computer.

10. The method of claim 9, wherein the one or more menus comprises one or more of a deal menu, a series menu, a scale menu, an order menu, a calendar menu, a detailed security syndicate menu, and a maturity detail menu, the one or more menus available for selection by the issuer computer.

11. The method of claim 1, wherein the at least one report for the selected security syndicate offering further comprises an expiration time corresponding to a time at which the selected security syndicate is no longer active.

12. The method of claim 1, wherein determining by the security syndicate transaction system the total number of orders received comprises determining whether an expiration time has been reached, the expiration time comprising a time at which orders for the selected security syndicate are no longer accepted by the security syndicate transaction system.

13. A security syndicate transaction system managing a security syndicate offering for monitoring by an issuer computer, comprising:
a communication network;
a server in operative communication with said communication network receiving communications via said communication network regarding an active security syndicated offering;
a data storage device in operative communication with said server, and storing at least one of the active security syndicated offering and information regarding a plurality of orders from a plurality of buyers, said order information associated to the at least one active security syndicated offering, where said active security syndicated offering is a bond;
a data processing system in operative communication with said server and said data storage device, and said data processing system:
transmitting for display to the issuer computer via said server one or more active security syndicate offerings, each of the one or more active security syndicate offerings having a predetermined value;
transmitting for display to the issuer computer via said server information associated with the selected security syndicate offering to the issuer computer for display, the information including at least a maturity date for the bond, a monetary amount for the maturity date, a coupon value, and at least one of a unit price per bond and an interest yield;
processing order information associated with the selected security syndicate offering based on at least a plurality of orders from the plurality of buyers, the order information processed with respect to at least one of a time which the at least plurality of orders is placed for the security syndicate offering, a size of the orders placed for the security syndicate offering, and at least one of an identity and characteristic of the plurality of buyers of the plurality of orders placed for the security syndicate offering;
generating at least one report for the selected security syndicate offering based on the processed information, the at least one report including the at least one of the time which the plurality of orders is placed for the security syndicate offering, the size of the orders placed for the security syndicate offering, and at least one of the identity of the plurality of buyers, characteristic of the plurality of buyers, and a geographic distribution of the plurality of orders placed for the security syndicate offering;
determining a total number of orders received, a rate at which orders are being received and determining one or more trends of the plurality of orders based on the at least one change in the relative size of orders being received and a change in the rate of orders being received;
transmitting to the issuer computer the at least one generated report for the selected syndicate offering for display by the issuer computer, the at least one report including report information comprising a total number of orders received, the rate at which the orders are being received, and the one or more trends to determine whether to adjust the selected security syndicate offering based on the one or more trends responsive to said generating and said transmitting the at least one report for the selected security syndicate offering;
receiving a request to adjust the selected security syndicate offering when it is determined to adjust the selected security syndicate offering, based on the one or more trends; and
inputting the request to and adjusting the selected security syndicate offering when the request is received to adjust the selected security syndicate offering.

14. The system of claim 13, wherein the geographic distribution of the plurality of orders placed for the security syndicate offering further includes the geographic origin of each of the plurality of orders.

15. The system of claim 13, wherein the change in the rate of orders being received is negative; and the step of determining whether to adjust the selected security syndicate offering based on the one or more trends includes adjusting at least the interest yield associated with the bond.

16. The system of claim 13, further comprising:
a senior manager computer for allowing a senior manager to transmit and receive information to and from said security syndicate transaction system; and
wherein said issuer computer is configured to transmit at least one message regarding said one or more trends.

17. The system of claim 16, wherein said senior manager computer adjusts at least one value from the information received by said issuer computer, said at least one value affecting the one or more trends.

18. The system of claim 13, further comprising determining an expiration time and whether the expiration time has been reached for the security syndicate, thereby if the expiration time has not been reached updating the security syndicate offering.

19. The system of claim 13, wherein the system receives information available to a senior manager without contacting the senior manager.

20. The system of claim 13, wherein the information associated with the selected security syndicate offering further comprises bond rating information, wherein the bond rating information is updated by the security syndicate transaction system in response to ratings provided by one or more rating agencies.

21. The system of claim 13, wherein transmitting to the issuer computer the at least one generated report for the selected syndicate offering for display by the issuer computer comprises providing one or more menus for display on the issuer computer.

22. The system of claim 21, wherein the one or more menus comprises one or more of a deal menu, a series menu, a scale menu, an order menu, a calendar menu, a detailed security syndicate menu, and a maturity detail menu, the one or more menus available for selection by the issuer computer.

23. The system of claim 13, wherein the at least one report for the selected security syndicate offering further comprises an expiration time corresponding to a time at which the selected security syndicate is no longer active.

24. The system of claim 13, wherein determining by the security syndicate transaction system the total number of orders received comprises determining whether an expiration time has been reached, the expiration time comprising a time at which orders for the selected security syndicate are no longer accepted by the security syndicate transaction system.

* * * * *

UNITED STATES PATENT AND TRADEMARK OFFICE
CERTIFICATE OF CORRECTION

PATENT NO. : 7,636,684 B1  Page 1 of 1
APPLICATION NO. : 10/102953
DATED : December 22, 2009
INVENTOR(S) : Horowitz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2293 days.

Signed and Sealed this

Ninth Day of November, 2010

David J. Kappos
*Director of the United States Patent and Trademark Office*